(12) United States Patent
Suzuki et al.

(10) Patent No.: US 7,536,438 B2
(45) Date of Patent: May 19, 2009

(54) METHOD OF ISSUING AN INTERIM MAIL ADDRESS AND SYSTEM FOR DOING THE SAME

(75) Inventors: Shintaro Suzuki, Tokyo (JP); Takeshi Fukuizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 1138 days.

(21) Appl. No.: 10/722,988

(22) Filed: Nov. 26, 2003

(65) Prior Publication Data

US 2004/0107262 A1 Jun. 3, 2004

(30) Foreign Application Priority Data

Nov. 27, 2002 (JP) .............................. 2002-343503

(51) Int. Cl.
G06F 15/16 (2006.01)
G06F 15/173 (2006.01)
G06F 15/177 (2006.01)

(52) U.S. Cl. ........................................ 709/206; 709/203

(58) Field of Classification Search ......... 709/200–203, 709/206, 217–224
See application file for complete search history.

(56) References Cited

U.S. PATENT DOCUMENTS

| | | | |
|---|---|---|---|
| 2003/0120656 A1* | 6/2003 | Kageyama et al. | 707/9 |
| 2003/0233415 A1* | 12/2003 | Beyda | 709/206 |
| 2004/0059705 A1* | 3/2004 | Wittke et al. | 707/1 |
| 2004/0205173 A1* | 10/2004 | Hall | 709/223 |

FOREIGN PATENT DOCUMENTS

| | | |
|---|---|---|
| CN | 1197565 | 10/1998 |
| JP | 2000-261491 | 9/2000 |
| JP | 2001-127788 | 5/2001 |
| JP | 2001-306455 | 11/2001 |
| JP | 2002-33759 | 1/2002 |
| JP | 2002-73475 | 3/2002 |
| JP | 2002-123470 | 4/2002 |
| JP | 2002-152245 | 5/2002 |
| JP | 2002-183329 | 6/2002 |

OTHER PUBLICATIONS

First Office Action issued in Chinese Patent Application No. 200310118628.3, dated May 12, 2006 (with English translation), pp. 1-16.

* cited by examiner

*Primary Examiner*—Haresh N Patel
(74) *Attorney, Agent, or Firm*—Michael Best & Friedrich, LLP

(57) ABSTRACT

There is provided a method of issuing a mail address to a user who makes e-mail communication with a mail-receiver through a server, including (a) on receipt of a request from the user to issue an interim mail address, issuing an interim mail address to the user from the server, (b) determining a threshold based on which the interim mail address is judged whether valid or invalid, (c) judging whether the interim mail address is valid or invalid, based on the threshold, and (d) if the interim mail address is judged valid, allowing the user to make e-mail communication with the mail-receiver through the use of the interim mail address in place of a mail address of the user.

68 Claims, 10 Drawing Sheets

26

| | MAIL ADDRESS OF USER | INTERIM MAIL ADDRESS | MAIL ADDRESS OF MAIL-RECEIVER | MAX NO. | NO. OF RECEIPT | EXPIRATION DATE | FLAG |
|---|---|---|---|---|---|---|---|
| USER A | aa@jp.com | xyz@jp.com | zz@jp.com | 3 | 2 | — | 1 |
| USER B | bb@jp.com | uvw@jp.com | yy@jp.com | 1 | 1 | — | 0 |
| USER C | cc@jp.com | rst@jp.com | xx@jp.com | 2 | 1 | 4/1/2003 13:10 | 0 |
| USER D | dd@jp.com | opq@jp.com | ww@jp.com | 3 | 1 | 4/9/2003 08:00 | 1 |
| ⋮ | ⋮ | ⋮ | ⋮ | ⋮ | ⋮ | ⋮ | ⋮ |

FIG.4

| | MAIL ADDRESS OF USER | INTERIM MAIL ADDRESS | MAIL ADDRESS OF MAIL-RECEIVER | MAX NO. | NO. OF RECEIPT | EXPIRATION DATE | FLAG |
|---|---|---|---|---|---|---|---|
| USER A | aa@jp.com | xyz@jp.com | zz@jp.com | 3 | 2 | — | 1 |
| USER B | bb@jp.com | uvw@jp.com | yy@jp.com | 1 | 1 | — | 0 |
| USER C | cc@jp.com | rst@jp.com | xx@jp.com | 2 | 1 | 4/1/2003 13:10 | 0 |
| USER D | dd@jp.com | opq@jp.com | ww@jp.com | 3 | 1 | 4/9/2003 08:00 | 1 |
| .... | .... | .... | .... | .... | .... | .... | .... |

26

METHOD OF ISSUING AN INTERIM MAIL ADDRESS AND SYSTEM FOR DOING THE SAME

CROSS REFERENCE TO RELATED APPLICATIONS

This application claims priority of Japanese patent application No. 2002-343503, filed Nov. 27, 2002.

BACKGROUND OF THE INVENTION

1. Field of the Invention

The invention relates to an e-mail system, and more particularly to a method of issuing an interim mail address temporarily used by a user.

2. Description of the Related Art

With recent worldwide development of a communication network such as Internet, an e-mail service is used by a lot of users as a rapid and cheap communication tool, and is now indispensable for their daily life. With development of an e-mail service, electronic commercial trade using a web site spreads widely.

When a person avails him/herself of service of a web site through his/her terminal such as a cellular phone, he/she often has to show his/her mail address to a web site. However, once he/she makes his/her mail address open, he/she may receive unnecessary e-mails such as an advertisement mail, a junk mail or spam mail from the web site or from a stranger other than the web site.

If he/she changes his/her mail address, he/she could escape from such unnecessary e-mails. However, a mail address is necessary to be registered to a provider, and it is usual that one mail address is assigned to one terminal. Thus, if he/she changes his/her mail address, there is caused a problem that he/she may not receive information advantageous or necessary for him/her.

In order to solve such a problem, Japanese Patent Application Publication No. 2002-123470 has suggested a system of converting a mail address. In the system, a specific mail address is issued to each of users independently of his/her mail address. A mail address of an e-mail transmitted from a certain user and addressed to the certain user is converted into his/her specific mail address, and then, an e-mail having the specific mail address is transmitted to a destination or received by the certain user. In accordance with the system, users having registered to the system can make e-mail communication with one another through the user of his/her specific mail address, and hence, it is no longer necessary for them to make their mail addresses open to others. If one of the registered users transmits a junk mail, a spam mail and so on to other registered users, an administrator of the system can search and identify a transmitter of such mails.

However, in the above-mentioned conventional system, both of an e-mail transmitter and an e-mail receiver have to register to the system to have a specific mail address. Hence, the system is not applicable to communication between a registered person and a non-registered person. Hence, a person, even if he/she registers to the system, cannot reject receipt of unnecessary e-mails transmitted from a non-registered person, such as an advertisement mail, a junk mail or a spam mail.

Japanese Patent Application Publication No. 2002-33759 has suggested an e-mail transmission system including a terminal through which a user transmits and receives e-mails, and a server. The server includes a first device which makes an interim account temporarily used by a user, a second device which stores the interim account therein, and a third device which transmits an e-mail transmitted from the terminal, to a destination through the use of the interim account.

Japanese Patent Application Publication No. 2002-152245 has suggested a pre-paid mail system which issues an Internet mail account which can be used under limited conditions.

Japanese Patent Application Publication No. 2000-261491 has suggested an e-mail service system for cellular phones. A user can transmit an e-mail through the use of an interim mail address without using his/her own mail address.

Japanese Patent Application Publication No. 2002-183329 has suggested an e-mail service system in which a user can transmit and receive e-mails through the use of an e-mail account assigned by a provider, in a period designated by a user. When the period expires, the provider invalidates an e-mail account assigned to a user.

SUMMARY OF THE INVENTION

In view of the above-mentioned problems in the conventional system, it is an object of the present invention to provide a method of issuing a mail address which allows a user to transmit an e-mail without informing a mail-receiver of the user's mail address to thereby prevent receipt of unnecessary e-mails.

It is also an object of the present invention to provide a system for issuing a mail address, a server used in such a system, and a program causing a computer to act as a server all of which allow a user to transmit an e-mail without informing a mail-receiver of the user's mail address to thereby prevent receipt of unnecessary e-mails.

In one aspect of the present invention, there is provided a method of issuing a mail address to a user who makes e-mail communication with a mail-receiver through a server, including (a) on receipt of a request from the user to issue an interim mail address, issuing an interim mail address to the user from the server, (b) determining a threshold based on which the interim mail address is judged whether valid or invalid, (c) judging whether the interim mail address is valid or invalid, based on the threshold, and (d) if the interim mail address is judged valid, allowing the user to make e-mail communication with the mail-receiver through the use of the interim mail address in place of a mail address of the user.

For instance, the request is assumed to be made when the server receives an e-mail from the user, in which case, the method preferably includes converting a mail address of a transmitter in the e-mail received from the user, into the interim mail address.

For instance, the request is assumed to be made when the server receives an e-mail from the user which e-mail is addressed to a mail-receiver not recorded in a user's telephone directory stored in the server, in which case, the method preferably includes converting a mail address of a transmitter in the e-mail received from the user, into the interim mail address.

The method may further include judging the interim mail address invalid when the user instructs invalidation of the interim mail address, even if the interim mail address is judged valid in the step (c).

There is further provided a method of issuing a mail address to a user who makes e-mail communication with a mail-receiver through a server, including (a) on receipt of a request from the user to issue an interim mail address, issuing an interim mail address to the user from the server, (b) recording a mail address of the user, a mail address of the mail-receiver, the interim mail address, and a maximum number by which the user is allowed to receive e-mails addressed to the interim mail address, into a mail-address recording table in a set, (c) when an e-mail addressed to the interim mail address is received at the server, if the number of receiving e-mails addressed to the interim mail address is smaller than the maximum number, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

The method may further include the step of, (e) when a mail address of a transmitter of the received e-mail is not identical with a mail address of the mail-receiver recorded in the mail-address recording table, or when the interim mail address is judged invalid, rejecting transmission of the received e-mail to the user.

There is still further provided a method of issuing a mail address to a user who makes e-mail communication with a mail-receiver through a server, including (a) on receipt of a request from the user to issue an interim mail address, issuing an interim mail address to the user from the server, (b) recording a mail address of the user, a mail address of the mail-receiver, the interim mail address, and an expiration date by which the user can transmit an e-mail having the interim mail address, into a mail-address recording table in a set, (c) when an e-mail addressed to the interim mail address is received at the server, if it is within the expiration date, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

The method may further include the step of, (e) when a mail address of a transmitter of the received e-mail is not identical with a mail address of the mail-receiver recorded in the mail-address recording table, or when the interim mail address is judged invalid, rejecting transmission of the received e-mail to the user.

There is yet further provided a method of issuing a mail address to a user who makes e-mail communication with a mail-receiver through a server, including (a) issuing an interim mail address in a terminal of the user, (b) transmitting the interim mail address and a threshold based on which the interim mail address is judged whether valid or invalid, to the server from the terminal, (c) judging whether the interim mail address is valid or invalid, based on the threshold, and (d) if the interim mail address is judged valid, allowing the user to make e-mail communication with the mail-receiver through the use of the interim mail address in place of a mail address of the user.

There is still yet further provided a method of issuing a mail address to a user who makes e-mail communication with a mail-receiver through a server, including (a) issuing an interim mail address in a terminal of the user, (b) transmitting a mail address of the user, a mail address of the mail-receiver, the interim mail address, and a maximum number by which the user is allowed to receive e-mails addressed to the interim mail address, to a mail-address recording table stored in the server, (c) when an e-mail addressed to the interim mail address is received at the server, if the number of receiving e-mails addressed to the interim mail address is smaller than the maximum number, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

The method may further include the step of, (e) when a mail address of a transmitter of the received e-mail is not identical with a mail address of the mail-receiver recorded in the mail-address recording table, or when the interim mail address is judged invalid, rejecting transmission of the received e-mail to the user.

There is further provided a method of issuing a mail address to a user who makes e-mail communication with a mail-receiver through a server, including (a) issuing an interim mail address in a terminal of the user, (b) transmitting a mail address of the user, a mail address of the mail-receiver, the interim mail address, and an expiration date by which the user can transmit an e-mail having the interim mail address, to a mail-address recording table stored in the server, (c) when an e-mail addressed to the interim mail address is received at the server, if it is within the expiration date, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

The method may further include the step of, (e) when a mail address of a transmitter of the received e-mail is not identical with a mail address of the mail-receiver recorded in the mail-address recording table, or when the interim mail address is judged invalid, rejecting transmission of the received e-mail to the user.

It is preferable that the threshold, the maximum number and the expiration date can be varied by the user.

In another aspect of the present invention, there is provided a system for issuing a mail address to a user, including a terminal through which the user makes e-mail communication with a mail-receiver, and a server through which the user transmits an e-mail to the mail-receiver, the server including (a) a first device which, on receipt of a request from the user to issue an interim mail address, issues an interim mail address to the user, (b) a second device which stores a threshold based on which the interim mail address is judged whether valid or invalid, (c) a third device which judges whether the interim mail address is valid or invalid, based on the threshold, and (d) a fourth device which, if the interim mail address is judged valid, allows the user to make e-mail communication with the mail-receiver through the use of the interim mail address in place of a mail address of the user.

For instance, the request may be assumed to be made when the first device receives an e-mail from the user, in which case, the server may further include a fifth device which converts a mail address of a transmitter in the e-mail received from the user, into the interim mail address.

For instance, the request may be assumed to be made when the first device receives an e-mail from the user which e-mail is addressed to a mail-receiver not recorded in a user's telephone directory stored in the server, in which case, the server may further include a fifth device which converts a mail address of a transmitter in the e-mail received from the user, into the interim mail address.

It is preferable that the third device judges the interim mail address invalid when the user instructs invalidation of the interim mail address, even if the interim mail address is judged valid, based on the threshold.

There is further provided a system for issuing a mail address to a user, including a terminal through which the user makes e-mail communication with a mail-receiver, and a server through which the user transmits an e-mail to the mail-receiver, the server including (a) a first device which, on receipt of a request from the user to issue an interim mail address, issues an interim mail address to the user, (b) a second device which records a mail address of the user, a mail address of the mail-receiver, the interim mail address, and a maximum number by which the user is allowed to receive e-mails addressed to the interim mail address, into a mail-address recording table in a set, (c) a third device which, when an e-mail addressed to the interim mail address is received at the server, if the number of receiving e-mails addressed to the interim mail address is smaller than the maximum number, judges the interim mail address of the received e-mail valid, and (d) a sixth device which, when a mail address of a transmitter of the received e-mail is identical with a mail address of the mail-receiver recorded in the mail-address recording table and further when the interim mail address is judged valid, reads a mail address of the user out of the mail-address recording table, and converts the interim mail address to the mail address of the user.

In the system, the server may further include (e) a seventh system which, when a mail address of a transmitter of the received e-mail is not identical with a mail address of the mail-receiver recorded in the mail-address recording table, or when the interim mail address is judged invalid, rejects transmission of the received e-mail to the user.

There is still further provided a system for issuing a mail address to a user, including a terminal through which the user makes e-mail communication with a mail-receiver, and a server through which the user transmits an e-mail to the mail-receiver, the server including (a) a first device which, on receipt of a request from the user to issue an interim mail address, issues an interim mail address to the user, (b) a second device which records a mail address of the user, a mail address of the mail-receiver, the interim mail address, and an expiration date by which the user can transmit an e-mail having the interim mail address, into a mail-address recording table in a set, (c) a third device which, when an e-mail addressed to the interim mail address is received at the server, if it is within the expiration date, judges the interim mail address of the received e-mail valid, and (d) a sixth device which, when a mail address of a transmitter of the received e-mail is identical with a mail address of the mail-receiver recorded in the mail-address recording table and further when the interim mail address is judged valid, reads a mail address of the user out of the mail-address recording table, and converts the interim mail address to the mail address of the user.

In the system, the server may further include (e) a seventh device which, when a mail address of a transmitter of the received e-mail is not identical with a mail address of the mail-receiver recorded in the mail-address recording table, or when the interim mail address is judged invalid, rejects transmission of the received e-mail to the user.

There is still further provided a system for issuing a mail address to a user, including a terminal through which the user makes e-mail communication with a mail-receiver, and a server through which the user transmits an e-mail to the mail-receiver, the terminal including (a) a first device which issues an interim mail address in a terminal of the user, and (b) an eighth device which transmits the interim mail address and a threshold based on which the interim mail address is judged whether valid or invalid, to the server, the server including (c) a third device which judges whether the interim mail address is valid or invalid, based on the threshold, and (d) a fourth device which, if the interim mail address is judged valid, allows the user to make e-mail communication with the mail-receiver through the use of the interim mail address in place of a mail address of the user.

There is yet further provided a system for issuing a mail address to a user, including a terminal through which the user makes e-mail communication with a mail-receiver, and a server through which the user transmits an e-mail to the mail-receiver, the terminal including (a) a first device which issues an interim mail address in a terminal of the user, and (b) a second device which transmits a mail address of the user, a mail address of the mail-receiver, the interim mail address, and a maximum number by which the user is allowed to receive e-mails addressed to the interim mail address, to a mail-address recording table stored in the server, the server including (c) a third device which, when an e-mail addressed to the interim mail address is received at the server, if the number of receiving e-mails addressed to the interim mail address is smaller than the maximum number, judges the interim mail address of the received e-mail valid, and (d) a sixth device which, when a mail address of a transmitter of the received e-mail is identical with a mail address of the mail-receiver recorded in the mail-address recording table and further when the interim mail address is judged valid, reads a mail address of the user out of the mail-address recording table, and converts the interim mail address to the mail address of the user.

The system may further include (e) a seventh device which, when a mail address of a transmitter of the received e-mail is not identical with a mail address of the mail-receiver recorded in the mail-address recording table, or when the interim mail address is judged invalid, rejects transmission of the received e-mail to the user.

There is further provided a system for issuing a mail address to a user, including a terminal through which the user makes e-mail communication with a mail-receiver, and a server through which the user transmits an e-mail to the mail-receiver, the terminal including (a) a first device which issues an interim mail address in a terminal of the user, and (b) a second device which transmits a mail address of the user, a mail address of the mail-receiver, the interim mail address, and an expiration date by which the user can transmit an e-mail having the interim mail address, to a mail-address recording table stored in the server, the server including (c) a third device which, when an e-mail addressed to the interim mail address is received at the server, if it is within the expiration date, judges the interim mail address of the received e-mail valid, and (d) a sixth device which, when a mail address of a transmitter of the received e-mail is identical with a mail address of the mail-receiver recorded in the mail-address recording table and further when the interim mail address is judged valid, reads a mail address of the user out of the mail-address recording table, and converts the interim mail address to the mail address of the user.

The system may further include (e) a seventh device which, when a mail address of a transmitter of the received e-mail is not identical with a mail address of the mail-receiver recorded in the mail-address recording table, or when the interim mail address is judged invalid, rejects transmission of the received e-mail to the user.

It is preferable that the threshold, the maximum number and the expiration date can be varied by the user.

In still another aspect of the present invention, there is provided a server through which e-mails are transmitted, including (a) a first device which, on receipt of a request from the user to issue an interim mail address, issues an interim mail address to the user, (b) a second device which stores a threshold based on which the interim mail address is judged whether valid or invalid, (c) a third device which judges whether the interim mail address is valid or invalid, based on the threshold, and (d) a fourth device which, if the interim mail address is judged valid, allows the user to make e-mail communication with the mail-receiver through the use of the interim mail address in place of a mail address of the user.

It is preferable that the first device judges that the request is made when the first device receives an e-mail from the user, and further including a fifth device which converts a mail address of a transmitter in the e-mail received from the user, into the interim mail address.

It is preferable that the first device judges that aid request is made when the first device receives an e-mail from the user which e-mail is addressed to a mail-receiver not recorded in a user's telephone directory stored in the server, and further including a fifth device which converts a mail address of a transmitter in the e-mail received from the user, into the interim mail address.

It is preferable that the third device judges the interim mail address invalid when the user instructs invalidation of the interim mail address, even if the interim mail address is judged valid, based on the threshold.

There is further provided a server through which e-mails are transmitted, including (a) a first device which, on receipt of a request from the user to issue an interim mail address, issues an interim mail address to the user, (b) a second device which records a mail address of the user, a mail address of the mail-receiver, the interim mail address, and a maximum number by which the user is allowed to receive e-mails addressed to the interim mail address, into a mail-address recording table in a set, (c) a third device which, when an e-mail addressed to the interim mail address is received at the server, if the number of receiving e-mails addressed to the interim mail address is smaller than the maximum number, judges the interim mail address of the received e-mail valid, (d) a ninth device which, when the interim mail address is judged valid, reads a mail address of the user out of the mail-address recording table, and (e) a tenth device which converts the interim mail address to the mail address of the user.

There is still further provided a server through which e-mails are transmitted, including (a) a first device which, on receipt of a request from the user to issue an interim mail address, issues an interim mail address to the user, (b) a second device which records a mail address of the user, a mail address of the mail-receiver, the interim mail address, and a maximum number by which the user is allowed to receive e-mails addressed to the interim mail address, into a mail-address recording table in a set, (c) a third device which, when an e-mail addressed to the interim mail address is received at the server, if the number of receiving e-mails addressed to the interim mail address is smaller than the maximum number, judges the interim mail address of the received e-mail valid, (d) a ninth device which, when the interim mail address is judged valid, reads a mail address of the user out of the mail-address recording table, and (e) a tenth device which converts the interim mail address to the mail address of the user.

There is yet further provided a server through which e-mails are transmitted, including (a) a second device which receives an interim mail address issued in a terminal of a user, and a threshold based on which the interim mail address is judged whether valid or invalid, from the terminal, (b) a third device which judges whether the interim mail address is valid or invalid, based on the threshold, and (c) a fourth device which, if the interim mail address is judged valid, allows the user to make e-mail communication with a mail-receiver through the use of the interim mail address in place of a mail address of the user.

There is still yet further provided a server through which e-mails are transmitted, including (a) a second device which receives a mail address of a user, an interim mail address issued in a terminal of the user, a mail address of a mail-receiver, and a maximum number by which the user is allowed to receive e-mails addressed to the interim mail address, from the terminal, and stores them in a mail-address recording table, (b) a third device which, when an e-mail addressed to the interim mail address is received at the server, if the number of receiving e-mails addressed to the interim mail address is smaller than the maximum number, judges the interim mail address of the received e-mail valid, and (c) a sixth device which, when a mail address of a transmitter of the received e-mail is identical with a mail address of the mail-receiver recorded in the mail-address recording table and further when the interim mail address is judged valid, reads a mail address of the user out of the mail-address recording table, and converts the interim mail address to the mail address of the user.

It is preferable that the server further includes a seventh device which, when a mail address of a transmitter of the received e-mail is not identical with a mail address of the mail-receiver recorded in the mail-address recording table, or when the interim mail address is judged invalid, rejects transmission of the received e-mail to the user.

There is further provided a server through which e-mails are transmitted, including (a) a second device which receives a mail address of a user, an interim mail address issued in a terminal of the user, a mail address of a mail-receiver, and an expiration date by which the user can transmit an e-mail having the interim mail address, from the terminal, and stores them in a mail-address recording table, (b) a third device which, when an e-mail addressed to the interim mail address is received at the server, if it is within the expiration date, judges the interim mail address of the received e-mail valid, and (c) a sixth device which, when a mail address of a transmitter of the received e-mail is identical with a mail address of the mail-receiver recorded in the mail-address recording table and further when the interim mail address is judged valid, reads a mail address of the user out of the mail-address recording table, and converts the interim mail address to the mail address of the user.

It is preferable that the server further includes a seventh device which, when a mail address of a transmitter of the received e-mail is not identical with a mail address of the mail-receiver recorded in the mail-address recording table, or when the interim mail address is judged invalid, rejects transmission of the received e-mail to the user.

It is preferable that the threshold, the maximum number and the expiration date can be varied by the user.

In yet another aspect of the present invention, there is provided a program for causing a computer to carry out a method of issuing a mail address to a user who makes e-mail communication with a mail-receiver through a server, wherein steps executed by the computer in accordance with the program include (a) on receipt of a request from the user to issue an interim mail address, issuing an interim mail address to the user from the server, (b) determining a threshold based on which the interim mail address is judged whether valid or invalid, (c) judging whether the interim mail address is valid or invalid, based on the threshold, and (d) if the interim mail address is judged valid, allowing the user to make e-mail communication with the mail-receiver through the use of the interim mail address in place of a mail address of the user.

It is preferable that the steps further include converting a mail address of a transmitter in the e-mail received from the user, into the interim mail address.

It is preferable that the steps further include judging the interim mail address invalid when the user instructs invalidation of the interim mail address, even if the interim mail address is judged valid in the step (c).

There is further provided a program for causing a computer to carry out a method of issuing a mail address to a user who makes e-mail communication with a mail-receiver through a server, wherein steps executed by the computer in accordance with the program include (a) on receipt of a request from the user to issue an interim mail address, issuing an interim mail address to the user from the server, (b) recording a mail address of the user, a mail address of the mail-receiver, the interim mail address, and a maximum number by which the user is allowed to receive e-mails addressed to the interim mail address, into a mail-address recording table in a set, (c) when an e-mail addressed to the interim mail address is received at the server, if the number of receiving e-mails addressed to the interim mail address is smaller than the maximum number, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

It is preferable that the steps further include, when a mail address of a transmitter of the received e-mail is not identical with a mail address of the mail-receiver recorded in the mail-address recording table, or when the interim mail address is judged invalid, rejecting transmission of the received e-mail to the user.

It is preferable that the steps further include converting a mail address of a transmitter in the e-mail received from the user, into the interim mail address.

It is preferable that the steps further include judging the interim mail address invalid when the user instructs invalidation of the interim mail address, even if the interim mail address is judged valid in the step (c).

There is still further provided a program for causing a computer to carry out a method of issuing a mail address to a user who makes e-mail communication with a mail-receiver through a server, wherein steps executed by the computer in accordance with the program include (a) on receipt of a request from the user to issue an interim mail address, issuing an interim mail address to the user from the server, (b) recording a mail address of the user, a mail address of the mail-receiver, the interim mail address, and an expiration date by which the user can transmit an e-mail having the interim mail address, into a mail-address recording table in a set, (c) when an e-mail addressed to the interim mail address is received at the server, if it is within the expiration date, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

There is yet further provided a program for causing a computer to carry out a method of issuing a mail address to a user who makes e-mail communication with a mail-receiver through a server, wherein steps executed by the computer in accordance with the program include (a) issuing an interim mail address in a terminal of the user, (b) transmitting the interim mail address and a threshold based on which the interim mail address is judged whether valid or invalid, to the server from the terminal, (c) judging whether the interim mail address is valid or invalid, based on the threshold, and (d) if the interim mail address is judged valid, allowing the user to make e-mail communication with the mail-receiver through the use of the interim mail address in place of a mail address of the user.

There is further provided a program for causing a computer to carry out a method of issuing a mail address to a user who makes e-mail communication with a mail-receiver through a server, wherein steps executed by the computer in accordance with the program include (a) issuing an interim mail address in a terminal of the user, (b) transmitting a mail address of the user, a mail address of the mail-receiver, the interim mail address, and a maximum number by which the user is allowed to receive e-mails addressed to the interim mail address, to a mail-address recording table stored in the server, (c) when an e-mail addressed to the interim mail address is received at the server, if the number of receiving e-mails addressed to the interim mail address is smaller than the maximum number, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

There is further provided a program for causing a computer to carry out a method of issuing a mail address to a user who makes e-mail communication with a mail-receiver through a server, wherein steps executed by the computer in accordance with the program include (a) issuing an interim mail address in a terminal of the user, (b) transmitting a mail address of the user, a mail address of the mail-receiver, the interim mail address, and an expiration date by which the user can transmit an e-mail having the interim mail address, to a mail-address recording table stored in the server, (c) when an e-mail addressed to the interim mail address is received at the server, if it is within the expiration date, judging the interim mail address of the received e-mail valid, and (d) when a mail address of a transmitter of the received e-mail is identical with a mail address of the mail-receiver recorded in the mail-address recording table and further when the interim mail address is judged valid, reading a mail address of the user out of the mail-address recording table, and converting the interim mail address to the mail address of the user.

The advantages obtained by the aforementioned present invention will be described hereinbelow.

In accordance with the present invention, the server issues an interim mail address to a user on receipt of a request from the user to do so. Hence, a user can transmit an e-mail without informing a mail-receiver of his/her mail address by using the thus issued interim mail address in place of his/her mail address. In addition, since a user can determine a threshold based on which an interim mail address is judged whether valid or invalid, the user can reject receipt of e-mails transmitted from a person who uses an interim mail address without authorization.

An e-mail addressed to an interim mail address is transmitted to a user having the interim mail address on when the e-mail is transmitted from a person recorded in a mail-address recording table and further when the interim mail address is judged valid. Hence, it is possible for a user to prevent receipt of unnecessary e-mails transmitted from persons other than predetermined persons recorded in the mail-address recording table. Thus, a user can reject unnecessary e-mails regardless of whether a transmitter of an e-mail is recorded in the mail-address recording table.

When a mail address of an e-mail transmitter is not recorded in the mail-address recording table or when an interim mail address is judged invalid, the server rejects transmission of the e-mail to a user, ensuring a user of an advantage that mail communication fee is reduced.

In addition, a user can determine a maximum number over which he/she cannot receive e-mails addressed to an interim mail address. Hence, even if an e-mail is transmitted from an authorized person, a user can reject receipt of the e-mail, if the number of past receipt of e-mails is over the maximum number.

A user can determine an expiration date of an interim mail address. Hence, even if an e-mail is transmitted from an authorized person, a user can reject receipt of the e-mail, if the expiration date of an interim mail address which the user has determined is already over.

A request of issuing an interim mail address can be assumed to be made when the server receives an e-mail from a user. The server may be designed to automatically issue an interim mail address on receipt of such a request, ensuring enhancement of serviceability to a user.

As an alternative, a request of issuing an interim mail address can be assumed to be made when the server receives an e-mail from a user and further when a mail address to which the received e-mail is addressed is not recorded in a user's telephone directory stored in the server. The server may be designed to automatically issue an interim mail address on receipt of such a request, ensuring enhancement of serviceability to a user.

A user's terminal may be designed to issue an interim mail address. Hence, a user can get an interim mail address, even if communication between his/her terminal and a server is interrupted.

A request of issuing an interim mail address can be assumed to be made when an e-mail to be transmitted from a user's terminal is addressed to a person not recorded in a user's telephone directory stored in the server, in which case, the terminal automatically issues an interim mail address, ensuring enhancement of serviceability to a user.

A request of issuing an interim mail address can be assumed to be made when a user selects issuance of an interim mail address. Thus, a user can determine whether an interim mail address is issued or not, when he/she transmits an e-mail.

Even if an interim mail address of a received mail is judged valid, the interim mail address is made invalid, if a user instructs to invalidate the interim mail address. Hence, a user can reject receipt of an e-mail having an interim mail address, at a timing which he/she determines.

A user can vary the threshold, the maximum number and the expiration date to his/her desired ones.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4 is an example of a mail-address recording table in the system in accordance with the first embodiment.

DESCRIPTION OF THE PREFERRED EMBODIMENTS

Preferred embodiments in accordance with the present invention will be explained hereinbelow with reference to drawings.

First Embodiment

Figure 1:
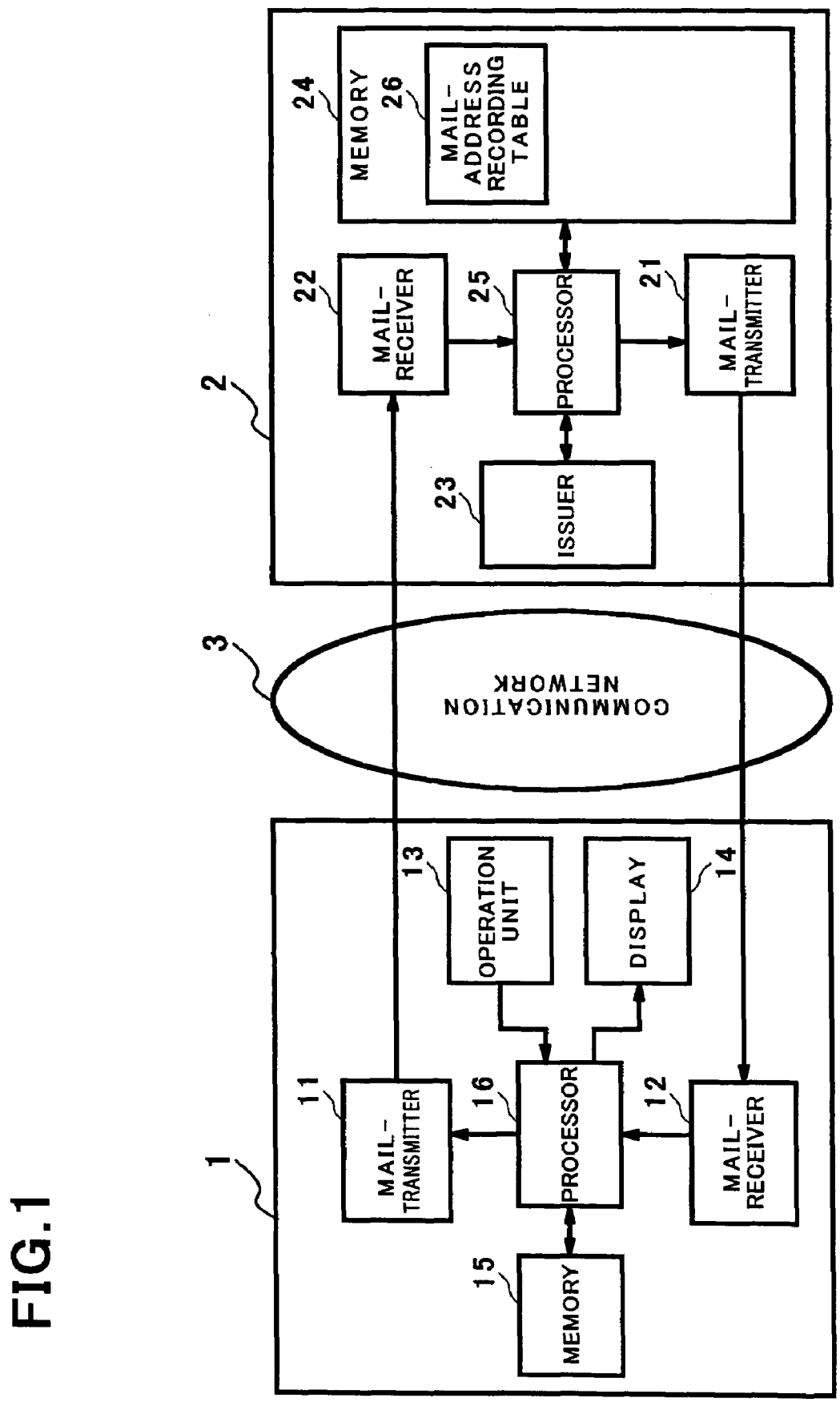
FIG. 1 is a block diagram of a system of issuing a mail address, in accordance with the first embodiment of the present invention.

FIG. 1 is a block diagram of a system of issuing a mail address, in accordance with the first embodiment of the present invention.

The system in accordance with the first embodiment is comprised of a plurality of terminals 1 (only one of which is illustrated in FIG. 1) through which a user transmits and receives e-mails, a server 2 which temporarily stores e-mails transmitted from the terminal 1, and transmits the stored e-mails to a designated address automatically or in accordance with an inquiry transmitted from the designated address, and a communication network 3 through which the terminal 1 and the server 2 makes communication with each other.

The terminal 1 is comprised of a mail-transmitter 11 through which an e-mail is transmitted, a mail-receiver 12 through which an e-mail is received, an operation unit 13 through which a user provides commands to the terminal 1 and a user inputs an e-mail, a display 14 in which various data including an e-mail is displayed, a memory 15 storing an e-mail made by a user and received e-mails therein, and a processor 16 controlling an operation of the terminal 1.

The server 2 is comprised of a mail-transmitter 21 through which an e-mail is transmitted, a mail-receiver 22 through which an e-mail is received, an issuer 23 which issues an interim mail address temporarily used by a user, a memory 24 storing e-mails received from the terminal 1 and a later mentioned mail-address recording table 26 therein, and a processor 25 controlling an operation of the server 2.

Figure 2:
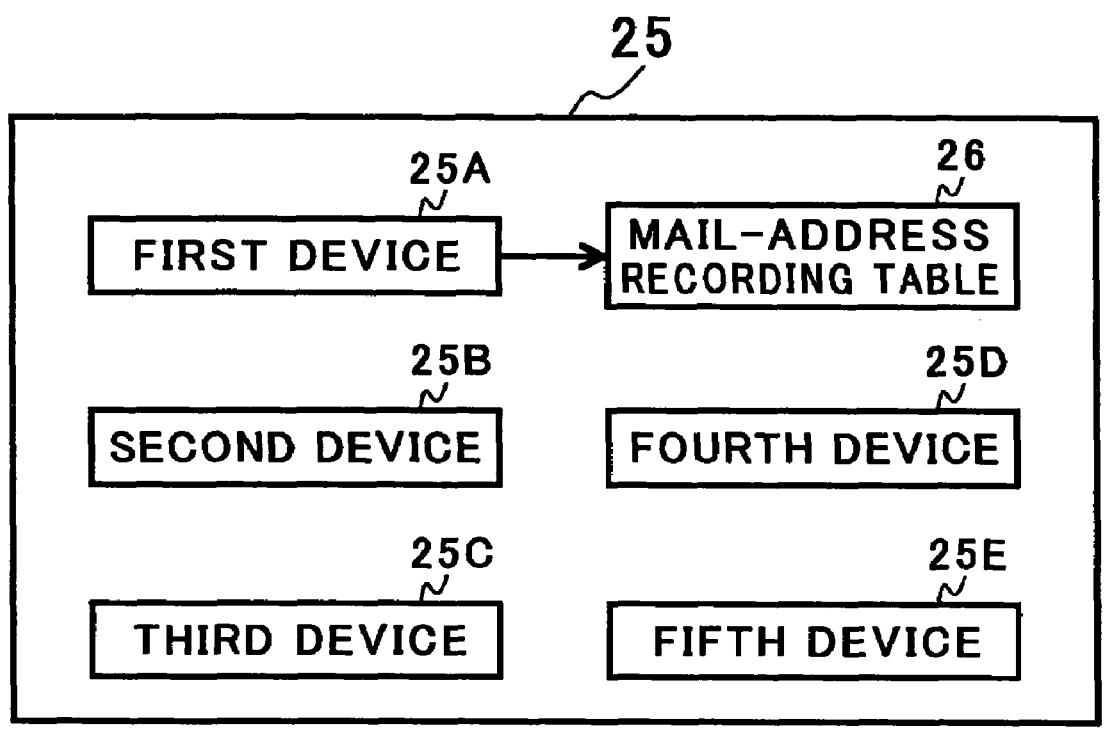
FIG. 2 is a block diagram of a processor which is one of components of the server in the system in accordance with the first embodiment.

FIG. 2 is a block diagram of the processor 25. As illustrated in FIG. 2, the processor 25 includes a first device 25A recording data into the mail-address recording table 26, a second device 25B judging whether an interim mail address is valid or invalid, a third device 25C converting an interim mail address of a received e-mail into a mail address of a user, a fourth device 25D which, when a mail address of a transmitter of a received e-mail addressed to an interim mail address is not identical with a mail address of an authorized person or when an interim mail address is judged valid, rejects transmission of a received e-mail to the terminal 1, and a fifth device 25E which converts a mail address of a transmitter in an e-mail received from a user, into an interim mail address.

Figure 3:
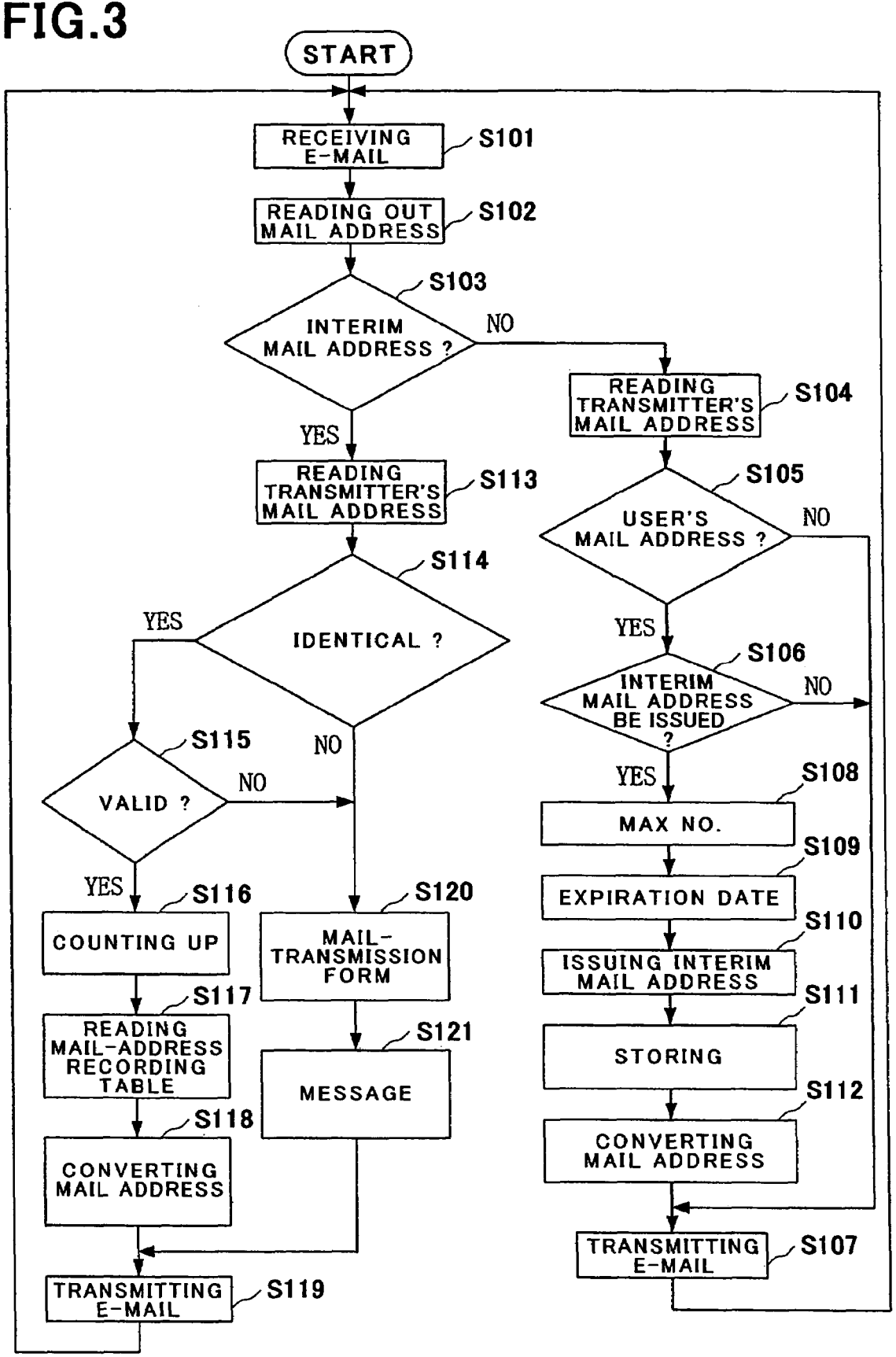
FIG. 3 is a flow-chart showing steps to be carried out in the server in the system in accordance with the first embodiment.

FIG. 3 is a flow-chart showing an operation of the server 2. Hereinbelow is explained an operation of the server 2 wit reference to FIG. 3.

First, a user who wants to have an mail address registers his/her mail address, a mail address of a mail-receiver with whom a user makes e-mail communication through the use of an interim mail address assigned from the server 2, a maximum number over which a user is not allowed to receive e-mails addressed to his/her interim mail address, and an expiration date of the interim mail address, into the server 2. Specifically, a user transmits an e-mail including them to a predetermined mail address of the server 2 through the terminal 1.

On receipt of the e-mail from the terminal 1, the processor 25 stores the above-mentioned information in the memory 24. The maximum number and the expiration date are used as thresholds based on which an interim mail address is judged whether valid or invalid.

Thus, registration of necessary information to the server 2 has been finished.

On receipt of an e-mail from the terminal 1 through the mail-receiver 22, the processor 25 stores the received e-mail in the memory 24, in step S101.

Then, the processor 25 reads out a mail address to which the received e-mail is addressed, in step S102.

Then, the processor 25 judges whether the thus read-out mail address is an interim mail address, in step S103.

The judgment of whether the mail address is an interim mail address can be carried out by retrieving the mail-address recording table 26 stored in the memory 24.

FIG. 4 is an example of the mail-address recording table 26.

The mail-address recording table 26 stores therein, for each of users, a mail address of a user, an interim mail address assigned to a user, a mail address of a mail-receiver to whom a user makes e-mail communication through the use of an assigned interim mail address, a maximum number over which a user is not allowed to receive e-mails addressed to his/her interim mail address, the number of receipt of e-mails addressed to his/her interim mail address, an expiration date of his/her interim mail address, and a flag indicative of whether an interim mail address is valid.

For instance, the mail-address recording table 26 stores, for the user A, a mail address "aa@jp.com", an interim mail address "xyz@jp.com", a mail address of a mail-receiver "zz@jp.com", a maximum number "3", a number of receipt "2", and a flag "1".

If a mail address to which the received e-mail is addressed is stored in a column of an interim mail address in the mail-address recording table 26, the processor 25 judges that a mail address to which the received e-mail is addressed is an interim mail address (YES in step S103).

If a mail address to which the received e-mail is addressed is not an interim mail address (NO in step S103), the processor 25 reads a mail address of a transmitter of the received e-mail in step S104, and then, judges whether the mail address of a transmitter of the received e-mail is a mail address of a user in step S105. If a transmitter of the received e-mail is a user who wants to have an interim mail address, a mail address of the user is recorded in the memory 24 as mentioned earlier. Consequently, the processor 25 can judge whether the mail address of a transmitter of the received e-mail is a mail address of a user.

If the processor 25 judges that the mail address of a transmitter of the received e-mail is a mail address of a user (YES in step S105), the processor 25 judges whether an interim mail address should be issued, in step S106. In the first embodiment, if a mail address of a transmitter of a received e-mail is a mail address of a user, the issuer 23 automatically issues an interim mail address. As an alternative, the processor 25 may be designed to transmit an inquiry to the terminal 1 to ask a user as to whether an interim mail address is to be issued, in which case, the processor 25 makes decision on whether an interim mail address is issued, in accordance with a response transmitted from a user.

If an interim mail address is issued (YES in step S106), the processor 25 determines a maximum number over which a user is not allowed to receive e-mails addressed to his/her interim mail address, in step S108, and thenfurther determines an expiration date of an interim mail address, in step S109. Then, the processor 25 causes the issuer 23 to issue an interim mail address, in step S110.

The processor 25 may determine both of a maximum number and an expiration date, or only one of them. As an alternative, the processor 25 may select a maximum number and an expiration date both of which were recorded by a user. As an alternative, the processor 25 may transmit an inquiry to a user, and determine a maximum number and an expiration date in accordance with a response from a user. Instead, the processor 25 may automatically determine them without transmitting an inquiry to a user.

Then, the processor 25 stores a mail address of a user (a mail address of a transmitter of the e-mail having been received in step S101), the thus issued interim mail address, a mail address of a mail-receiver with whom a user makes e-mail communication through the use of an assigned interim mail address (a mail address to which the received e-mail is addressed), the maximum number, the number of receipt of e-mails addressed to the interim mail address, the expiration date of an interim mail address, and the flag into the mail-address recording table 26 in association with one another, in step S111. When recorded into the mail-address recording table 26, the number of receipt of e-mails is reset to an initial number "0", and the flag is reset into "1" which indicates that an interim mail address is valid.

Then, the processor 25 converts a mail address of a transmitter of the e-mail having been received in step S101, into an interim mail address having been issued in step S10, in step S112.

Then, the processor 25 transmits an e-mail having the thus assigned interim mail address, to the terminal 1 through the mail-transmitter 21, in step S107.

The above-mentioned steps S101 to S106, S108 to S112 and S107 are carried out when an interim mail address is newly issued, and a user transmits an e-mail having the interim mail address as a transmitter address, to a mail-receiver. By using an interim mail address, a user can transmit an e-mail to a mail-receiver without informing the mail-receiver of his/her mail address.

If the processor 25 judges that the mail address of a transmitter of the received e-mail is not a mail address of a user (NO in step S105) or if an interim mail address is not issued (NO in step S106), the processor 25 allows an e-mail to be transmitted in a normal way. Specifically, the processor 25 transmits the e-mail having been received and stored in the memory 24 in step S101, to the terminal through the mail-transmitter 21, in step S107. The steps S101 to S105, S107 and S101 to S107 are carried out when an e-mail is transmitted without using an interim mail address.

When the processor 25 judges that a mail address to which the received e-mail is addressed is an interim mail address (YES in step S103), the processor 25 reads out a mail address of a transmitter of the received e-mail, in step S113.

Then, the processor 25 judges whether the thus read-out mail address of a transmitter of the received e-mail is a mail address of a mail-receiver to whom the user makes e-mail communication through the user of an interim mail address, in step S114.

If a mail address of a mail-receiver stored in the mail-address recording table 26 in association with an interim mail address is identical with the thus read-out mail address of a transmitter of the received e-mail (YES in step S114), the processor 25 judges whether an interim mail address is valid or invalid, in step S115.

If the flag recorded in the mail-address recording table 26 in association with an interim mail address indicates "1", the interim mail address is valid. When only a maximum number is determined to an interim mail address, if the number of receipt of e-mails addressed to an interim mail address is smaller than the maximum number, the flag indicates "1". For instance, with respect to the user A shown in FIG. 4, since the number of receipt of e-mails is "2" and the maximum number is "3", the flag is set "1" indicating that an interim mail address is valid. In contrast, with respect to the user B shown in FIG. 4, since the number of receipt of e-mails is "1" and the maximum number is "1", the flag is set "0" indicating that an interim mail address is invalid.

When only an expiration date is determined to an interim mail address, if it is not past the expiration date, the flag is set "1".

When both of a maximum number and an expiration date are determined to an interim mail address, if the number of receipt of e-mails addressed to an interim mail address is smaller than the maximum number and it is not past the expiration date, the flag is set "1". For instance, it is assumed that it is now PM 16:00, Apr. 2, 2003. With respect to the user C shown in FIG. 4, the present date and time is already past the expiration date of PM 13:10, Apr. 1, 2003. Hence, the flat is set "0". With respect to the user D, the number of receipt of e-mails addressed to an interim mail address is smaller than the maximum number and the present date and time is not past the expiration date, the flag is set "1".

If an interim mail address is valid, the processor 25 judges that the e-mail transmitted from a mail-receiver is allowed to be transmitted to a user, and counts up the number of receipt recorded in the mail-address recording table 26 by one in association with the interim mail address, in step S116.

Then, the processor 25 reads a mail address of a user associated with the interim mail address having been judged valid, out of the mail-address recording table 26, in step S117. Then, the processor 25 converts a mail address (an interim mail address) to which the received e-mail is addressed, into the thus read-out mail address, in step S118.

Then, the processor 25 transmits the e-mail to the terminal 1 of a user through the mail-transmitter 21, in step S119.

The steps S101 to S103 and S113 to S119 are carried out when the terminal 1 transmits an e-mail having an interim mail address as a transmitter address, to a terminal of a mail-receiver, and receives an e-mail addressed to the interim mail address, from the mail-receiver, and further when the interim mail address is valid.

If a mail address of a mail-receiver stored in the mail-address recording table 26 in association with an interim mail address is not identical with the mail address of a transmitter of the received e-mail (NO in step S114), or if the processor 25 judges that the interim mail address is invalid (NO in step S115), the processor 25 judges it unallowable to transmit the received e-mail to a user. The processor 25 makes a mail-transmission form in step S120, and transmits the mail-transmission form together with a message that since the interim mail address is invalid, the e-mail is not transmitted to a user, to a mail address of a transmitter of the e-mail having been received in step S101, in step S119.

In the first embodiment, as explained above, only when an e-mail addressed to an interim mail address is transmitted from a person recorded in the mail-address recording table 26 and further when the interim mail address is judged valid, the e-mail is transmitted to a user having the interim mail address. Hence, it is possible for a user to prevent receipt of unnecessary e-mails such as a junk mail.

In addition, a user can determine a maximum number over which he/she cannot receive e-mails addressed to an interim mail address, and/or an expiration date of an interim mail address. Hence, even if an e-mail is transmitted from an authorized person, a user can reject receipt of the e-mail, if the number of past receipt of e-mails is over the maximum number or if the present date and time is past the expiration date.

Second Embodiment

Figure 5:
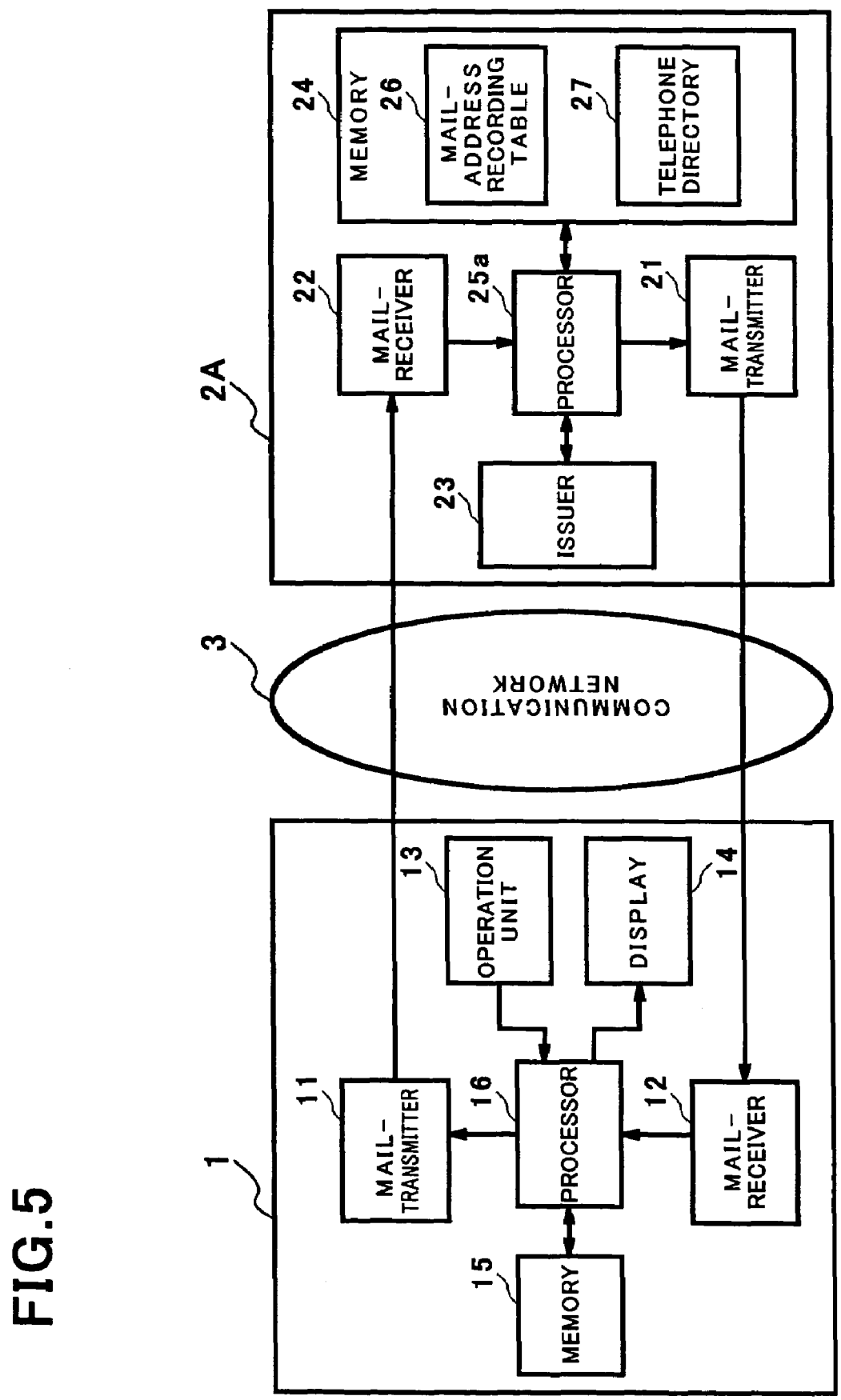
FIG. 5 is a block diagram of a system of issuing a mail address, in accordance with the second embodiment of the present invention.

FIG. 5 is a block diagram of a system of issuing a mail address, in accordance with the second embodiment. Parts or elements that correspond to those of the first embodiment illustrated in FIG. 1 have been provided with the same reference numerals, and operate in the same manner as corresponding parts or elements in the first embodiment, unless explicitly explained hereinbelow.

The second embodiment is structurally different from the first embodiment in that the memory 24 in a server 2A is designed to include a user's telephone directory 27. The telephone directory 27 stores mail addresses, telephone numbers and other analogous data of persons with whom a user makes e-mail communication. A user can newly store data into the user's telephone directory 27 through his/her terminal 1 and update or edit data stored in the user's telephone directory 27.

Figure 6:
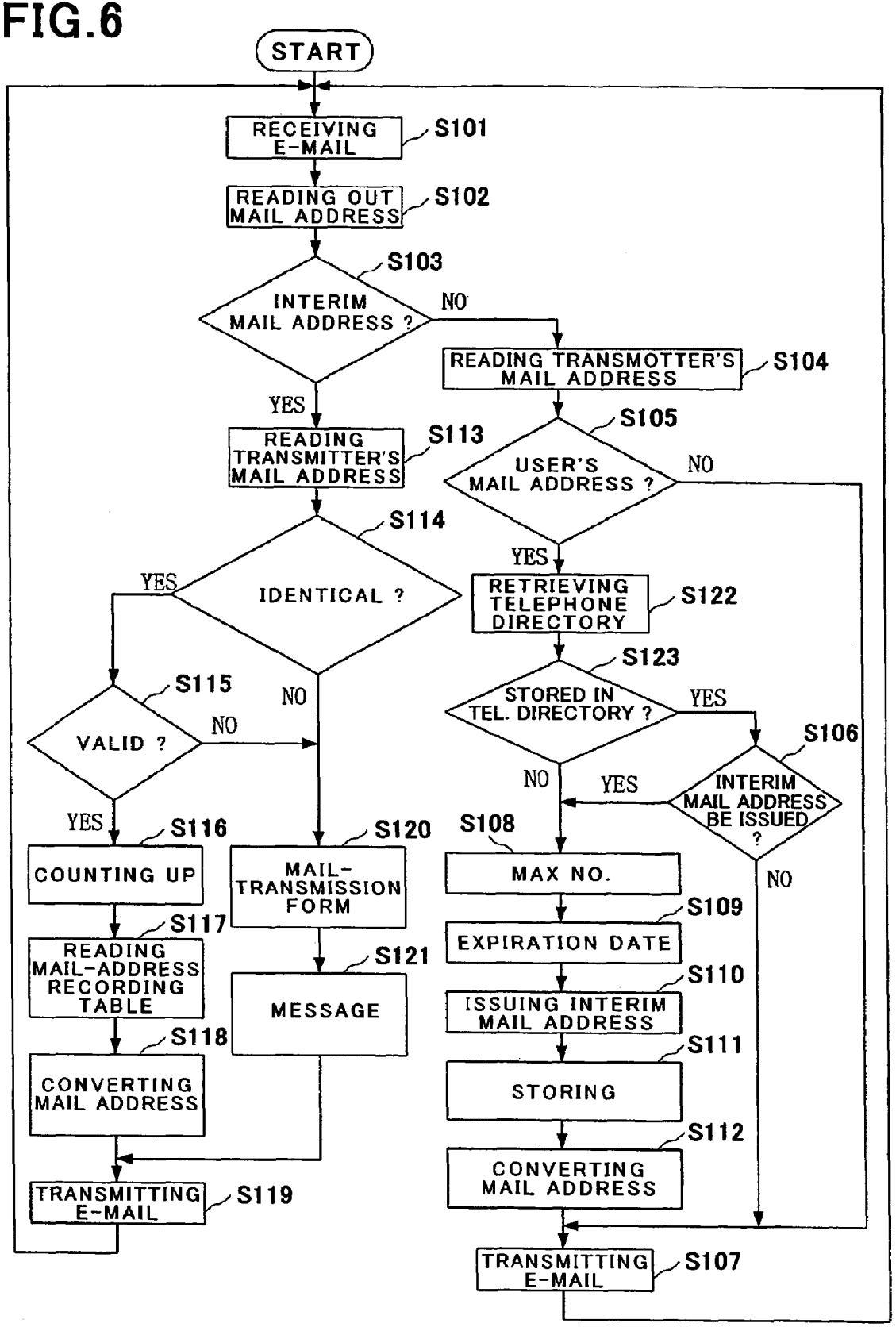
FIG. 6 is a flow-chart showing steps to be carried out in the server in the system in accordance with the second embodiment.

FIG. 6 is a flow-chart showing steps to be carried out in the server 2A. Hereinbelow is explained an operation of the server 2A with reference to FIG. 6.

An operation to be carried out by the server 2A when a mail address to which a received e-mail is addressed is an interim mail address is the same as the operation of the server 2 in the first embodiment, and hence, is not explained.

If the processor 25a judges that a mail address of a transmitter of a received e-mail is a mail address of a user (YES in step S105), the processor 25a retrieves the user's telephone directory 27 stored in the memory 24, in step S122.

Then, the processor 25a checks whether a mail address to which a received e-mail is addressed is stored in the user's telephone directory 27, in step S123.

If a mail address to which a received e-mail is addressed is stored in the user's telephone directory 27 (YES in step S123), the step S106 and the subsequent steps are carried out similarly to the first embodiment.

If a mail address to which a received e-mail is addressed is not stored in the user's telephone directory 27 (NO in step S123), the step S108 and the subsequent steps are carried out similarly to the first embodiment.

In the second embodiment, as explained above, if a mail address to which a received e-mail is addressed is not stored in the user's telephone directory 27, the issuer 23 in the server 2A automatically issues an interim mail address. Thus, a user could have enhanced serviceability.

If a mail address to which a received e-mail is addressed is stored in the user's telephone directory 27, an interim mail address may be issued or may not be issued. A user can determine in advance whether an interim mail address is issued, if a mail address to which a received e-mail is addressed is stored in the user's telephone directory 27. A user can input his/her decision in advance into the server 2A through his/her terminal 2A.

As an alternative, the server 2A may be designed to transmit an inquiry e-mail to a user to inquire the user of whether an interim mail address is issued.

Third Embodiment

Figure 7:
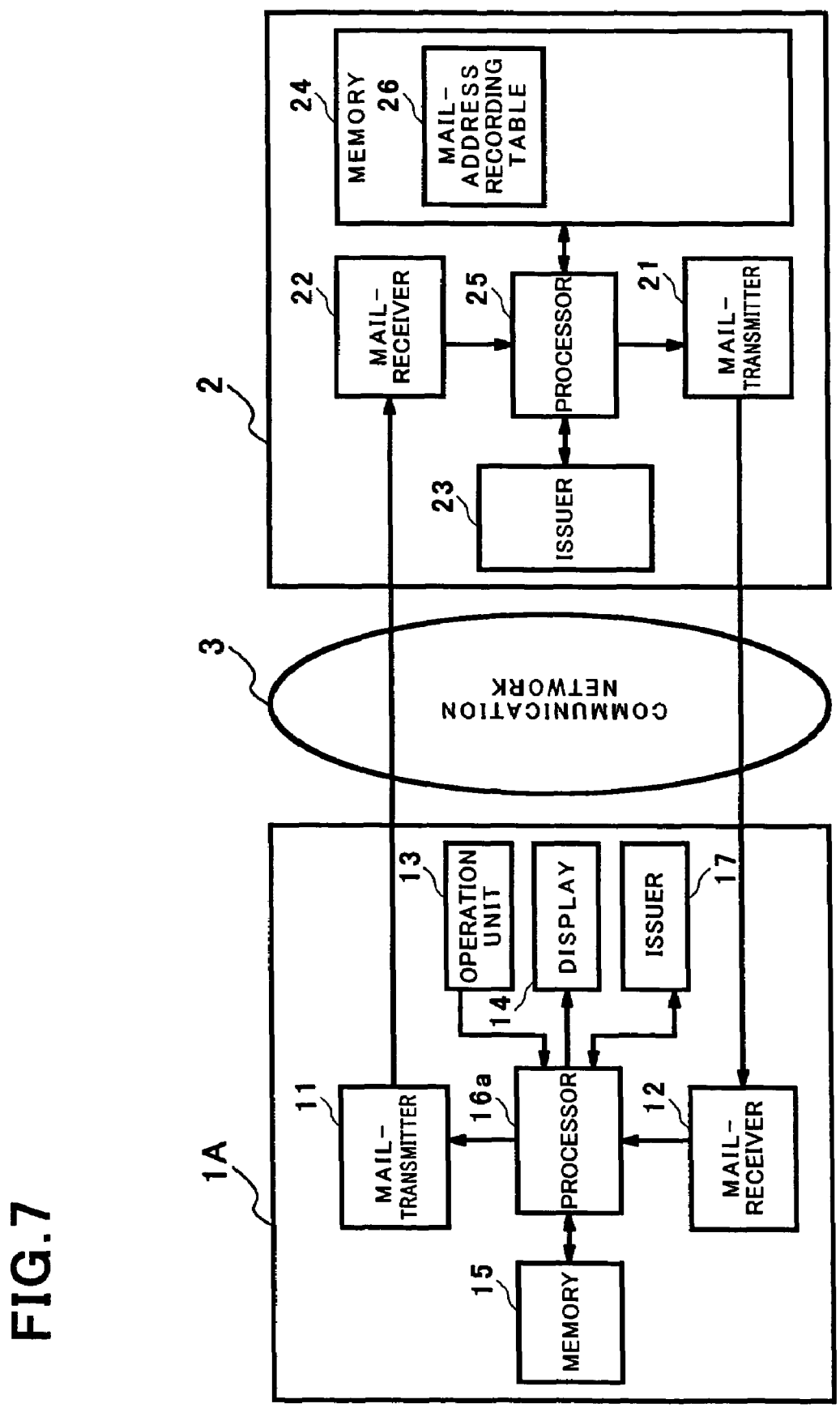
FIG. 7 is a block diagram of a system of issuing a mail address, in accordance with the third embodiment of the present invention.

FIG. 7 is a block diagram of a system of issuing a mail address, in accordance with the third embodiment. Parts or elements that correspond to those of the first embodiment illustrated in FIG. 1 have been provided with the same reference numerals, and operate in the same manner as corresponding parts or elements in the first embodiment, unless explicitly explained hereinbelow.

The third embodiment is structurally different from the first embodiment in that a terminal 1A is designed to additionally include an issuer 17 for issuing an interim mail address. A processor 16a in the terminal 1A converts a mail address of a transmitter of an e-mail made by a user, into an interim mail address issued from the issuer 17.

Figure 8:
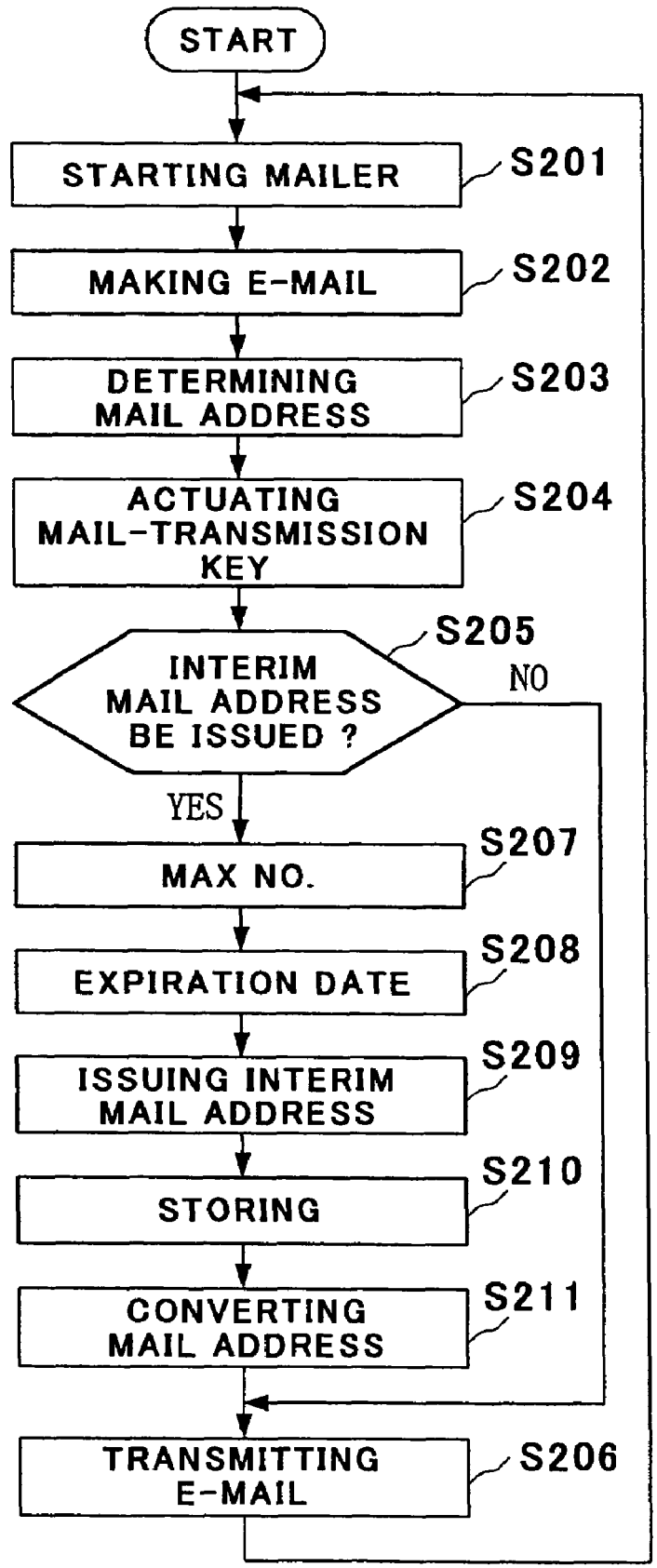
FIG. 8 is a flow-chart showing steps to be carried out in the terminal when an e-mail is transmitted, in the system in accordance with the third embodiment.

FIG. 8 is a flow-chart showing steps to be carried out by the terminal 1A when it transmits an e-mail. Hereinbelow is explained an operation of the terminal 1A.

First, a user who wants to have an interim mail address operates the operation unit 13 for starting a mailer, in step S201.

Then, a user makes sentences of an e-mail in step S202, determines a mail address of a mail-receiver in step S203, and actuates a mail-transmission key in step S204.

When the mail-transmission key is actuated, the processor 16a judges whether an interim mail address is issued or not, in step S205. Decision as to whether an interim mail address is issued may be dependent on instructions which a user has input in advance into the terminal 1A. As an alternative, the processor 16a may display an inquiry in the display 14 to inquire a user of whether an interim mail address is issued or not.

If an interim mail address is not issued (NO in step S205), the processor 16a transmits an e-mail in a normal way. That is, the processor 16a transmits an e-mail into the communication network 3 through the mail-transmitter 11, in step S206. The e-mail is stored into the memory 204 through the mail-receiver 22. The steps S201 to S206 are carried out when an e-mail is transmitted without using an interim mail address.

In contrast, if an interim mail address is issued (YES in step S205), the processor 16a determines a maximum number over which a user is not allowed to receive e-mails addressed to his/her interim mail address, in step S207, and then, further determines an expiration date of an interim mail address, in step S208. Then, the processor 16a causes the issuer 17 to issue an interim mail address, in step S209.

The processor 16a may determine both of a maximum number and an expiration date, or only one of them. As an alternative, the processor 16a may select a maximum number and an expiration date both of which were recorded by a user. As an alternative, the processor 16a may transmit an inquiry to a user, and determine a maximum number and an expiration date in accordance with a response from a user. Instead, the processor 16a may automatically determine them without transmitting an inquiry to a user.

An interim mail address issued from the issuer 17 may be comprised of an interim mail address having been issued by the server 2 in advance, or a combination of characters designated by the server 2.

In the former, when a user transmits a request to the server 2 through his/her terminal 1A to assign an interim mail address to him/her, the processor 25 causes the issuer 23 to issue one or a plurality of interim mail address(es). The thus issued interim mail address(es) is(are) stored in the memory 24, and transmitted to the terminal 1A through the mail-transmitter 21.

The processor 16a stores received interim mail address(es) in the memory 15. On receipt of an instruction transmitted from the processor 16a, the issuer 17 reads an interim mail address out of the memory 15. If the memory stores a plurality of interim mail addresses, the issuer 17 selects one of them.

In the latter, when a user transmits a request to the server 2 through his/her terminal 1A to assign an interim mail address to him/her, the processor 25 instructs the issuer 23 to issue a pattern from which an interim mail address is to be made. A pattern issued from the issuer 23 is comprised of a plurality of characters (alphabet, figures and symbols) and a certain number, and is determined such that an interim mail address derived from a pattern is unique to a user. The thus issued pattern is stored in the memory 24, and transmitted to the terminal 1A through the mail-transmitter 21.

The processor 16a in the terminal 1A stores the received pattern into the memory 15. The issuer 17 which was instructed to issue an interim mail address from the processor 16a reads the pattern out of the memory 15, and issues an interim mail address, based on the pattern.

Examples of an interim mail address made in accordance with a pattern are explained hereinbelow.

It is assumed that when the user A transmits a request to the server 2 to assign an interim mail address to him/her, the processor 16a in his/her terminal 1A receives a pattern comprised of characters "abc123" and a number "6", from the server 2. In accordance with the pattern, the issuer 17 issues an interim mail address such as "a1 b2c3@jp.com" or "bc12a3@jp.com". For instance, an interim mail address such as "abcd123@jp.com" is invalid, because the interim mail address includes not six characters, but seven characters before "@" contrary to a number "6" indicated in the pattern, and further because the interim mail address includes a character "d" not designated in the pattern.

It is assumed that when the user B transmits a request to the server 2 to assign an interim mail address to him/her, the processor 16a in his/her terminal 1A receives a pattern comprised of characters "abcde12" and a number "7", from the server 2. In accordance with the pattern, the issuer 17 issues an interim mail address such as "a1b2cde@jp.com". For instance, an interim mail address such as "abcd123@jp.com" is invalid, because the interim mail address includes a character "3" not designated in the pattern, and does not include a character "e" designated in the pattern.

An interim mail address is issued in one of the above-mentioned ways.

Then, the processor 16*a* transmits an e-mail to the server 2 in order to register an interim mail address into the server 2. The e-mail includes a mail address of a user (a mail address of a transmitter of an e-mail), an interim mail address issued in the step S209, a mail address of a mail receiver with whom a user makes e-mail communication through the user of the interim mail address (a mail address to which an e-mail is addressed), a maximum number determined in step S207, a number of receipt of e-mails addressed to the interim mail address, an expiration date determined in step S208, and a flag indicative of whether an interim mail address is valid or invalid. The number of receipt of e-mails addressed to the interim mail address is reset to "0", and the flag is initialized to "1".

On receipt of the above-mentioned e-mail from the terminal 1A, the processor 25 in the server 2 stores a mail address of a user, an interim mail address, a mail address of a mail-receiver, a maximum number, a number of receipt of e-mails addressed to the interim mail address, an expiration date, and a flag into the mail-address recording table 26, in step S210.

The processor 16*a* converts a mail address of a transmitter of an e-mail made in the steps S201 to S204, into an interim mail address issued in step S209, in step S211.

Then, the processor 16*a* transmits an e-mail having the thus converted mail address, to the communication network 3 through the mail-transmitter 11, in step S206. The thus transmitted e-mail is stored into the memory 24 in the server 2 through the mail-receiver 22.

The steps S201 to S205, S207 to S211 and S206 are carried out when the terminal 1A newly issues an interim mail address, and a user transmits an e-mail having an interim mail address as a mail address of an e-mail transmitter, to a mail-receiver. A user can transmit an e-mail to a mail-receiver without informing the mail-receiver of his/her mail address.

The steps to be carried out by the server 2 when it receives an e-mail from a user or when it receives an e-mail from a mail-receiver are identical with the steps carried out by the server 2 in the first embodiment.

In the third embodiment, as explained above, only when an e-mail addressed to an interim mail address is transmitted from a person recorded in the mail-address recording table 26 and further when the interim mail address is judged valid, the e-mail is transmitted to a user having the interim mail address. Hence, it is possible for a user to prevent receipt of unnecessary e-mails such as a junk mail.

In addition, the terminal 1A is designed to issue an interim mail address. Hence, a user can get an interim mail address, even if communication between his/her terminal 1A and the server 2 is interrupted.

In the third embodiment, after a mail address of a user, an interim mail address, a mail address of a mail-receiver, a maximum number, a number of receipt, an expiration date, and a flag have been recorded into the mail-address recording table 26 in step S210, a mail address of an e-mail transmitter is converted into an interim mail address in step S211. The step S211 may be carried out prior to the step S210.

Fourth Embodiment

Figure 9:
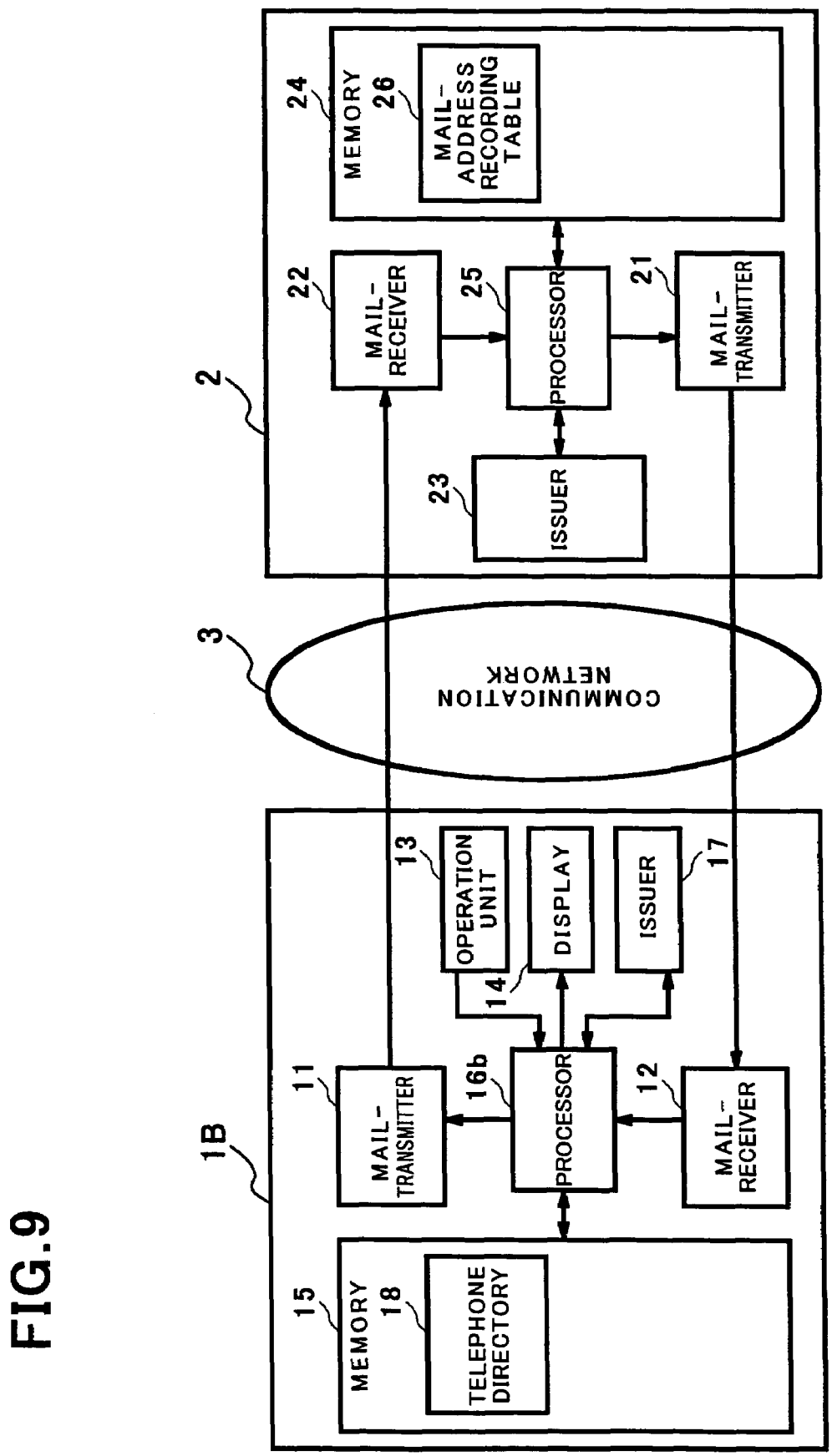
FIG. 9 is a block diagram of a system of issuing a mail address, in accordance with the fourth embodiment of the present invention.

FIG. 9 is a block diagram of a system of issuing a mail address, in accordance with the fourth embodiment. Parts or elements that correspond to those of the first embodiment illustrated in FIG. 1 have been provided with the same reference numerals, and operate in the same manner as corresponding parts or elements in the first embodiment, unless explicitly explained hereinbelow.

The fourth embodiment is structurally different from the first embodiment in that a terminal 1B is designed to additionally include a user's telephone directory 18 in the memory 15.

Figure 10:
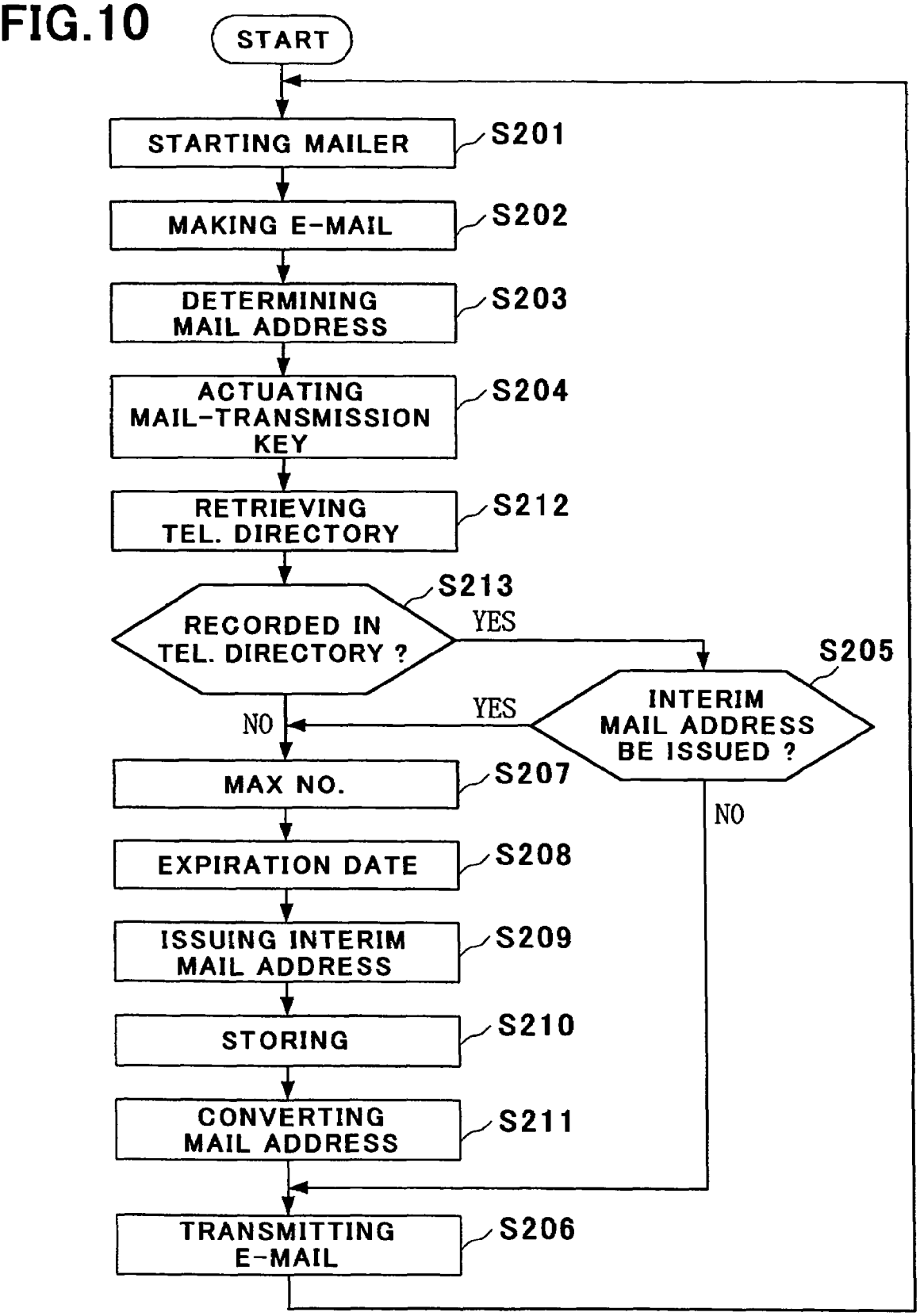
FIG. 10 is a flow-chart showing steps to be carried out in the terminal when an e-mail is transmitted, in the system in accordance with the fourth embodiment.

FIG. 10 is a flow-chart showing steps to be carried out by the terminal 1B when the terminal 1B transmits an e-mail. Steps that correspond to those of the steps in FIG. 8 have been provided with the same reference numerals. Hereinbelow is explained an operation of the terminal 1B.

The steps S201 to S204 are carried out in the same way as the third embodiment.

When a mail-transmission key in the operation unit 13 is actuated, the processor 16*b* retrieves the user's telephone directory 18, in step S212.

Then, the processor 16*b* checks whether a mail address to which an e-mail made in the steps S201 to S204 is addressed is recorded in the user's telephone directory 18, in step S213.

If a mail address to which an e-mail made in the steps S201 to S204 is addressed is recorded in the user's telephone directory 18 (YES in step S213), the step S205 and the subsequent steps are carried out, similarly to the third embodiment.

If a mail address to which an e-mail made in the steps S201 to S204 is addressed is not recorded in the user's telephone directory 18 (NO in step S213), the step S207 and the subsequent steps are carried out, similarly to the third embodiment.

The steps to be carried out by the server 2 when it receives an e-mail from a user or when it receives an e-mail from a mail-receiver are identical with the steps carried out by the server 2 in the first embodiment.

In the fourth embodiment, as explained above, if a mail address to which an e-mail made by a user is addressed is not recorded in the user's telephone directory 18, the issuer 17 of the terminal 1B automatically issues an interim mail address. Thus, a user can have enhanced serviceability.

In the above-mentioned first to fourth embodiments, if the flag indicates "1", an interim mail address is judged valid. Instead, if the server 2 receives an instruction from a user to invalidate an interim mail address, an interim mail address may be judged invalid. Thus, a user can reject receipt of e-mails addressed to an interim mail address whenever a user wants to do so.

The server 2 has such a structure as mentioned above, and operates in such a manner as mentioned above.

The server 2 may be accomplished by a data processor such as a personal computer or a workstation, and a program to carry out the functions of the server 2. Such a program may be presented through a recording medium readable by a computer. The program is read out into a data processor when the data processor starts its operation. By controlling an operation of the data processor, the parts constituting the server 2, such as the mail-transmitter 21, the mail-receiver 22, the issuer 23, the memory 24, and the processor 25 can be accomplished in the data processor. The memory 24 can be accomplished by a storage device of the data processor, such as a magnetic disc.

An operation of the server 2 can be accomplished by a computer program written in a language readable by a computer.

For operating the server 2 by means of a computer program, the server 2 is designed to include a memory to store a computer program therein, for instance. The computer program is stored in the memory, and is read out into the server 2 when the server 2 starts its operation. Thus, such an operation of the server 2 as mentioned above is accomplished in accordance with the computer program.

As an alternative, a recording medium storing such a computer program as mentioned above may be set into the server 2 to be read out by the processor 25 in the server 2.

The functions of the server 2 may be accomplished as a program including various commands, and be presented through a recording medium readable by a computer.

In the specification, the term "recording medium" means any medium which can record data therein.

The term "recording medium" includes, for instance, a disk-shaped recorder such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk, a memory chip such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM such as a compact flush card, a hard disk, and any other suitable means for storing a program therein.

A recording medium storing a program for accomplishing the server 2 may be accomplished by programming functions of the server 2 with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-343503 filed on Nov. 27, 2002 including specification, claims, drawings and summary is incorporated herein by reference in its entirety.

What is claimed is:

1. A method of issuing a mail address to a user who makes e-mail communication with a mail-receiver through a server, comprising:
(a) on receipt of a request from said user to issue an interim mail address, issuing an interim mail address to said user from said server;
(b) recording a mail address of said user, a mail address of said mail-receiver, said interim mail address, and a maximum number by which said user is allowed to receive e-mails addressed to said interim mail address, into a mail-address recording table in a set;
(c) when an e-mail addressed to said interim mail address is received at said server, if the number of receiving e-mails addressed to said interim mail address is smaller than said maximum number, judging said interim mail address of the received e-mail valid; and
(d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user,
wherein said request is made when said server receives an e-mail from said user which e-mail is addressed to a mail-receiver not recorded in a user's telephone directory stored in said server, and further comprising converting a mail address of a transmitter in said e-mail received from said user, into said interim mail address.

2. The method as set forth in claim 1, further comprising the step of, (e) when a mail address of a transmitter of the received e-mail is not identical with a mail address of said mail-receiver recorded in said mail-address recording table, or when said interim mail address is judged invalid, rejecting transmission of the received e-mail to said user.

3. The method as set forth in claim 1, wherein said request is made when said server receives an e-mail from said user, and further comprising converting a mail address of a transmitter in said e-mail received from said user, into said interim mail address.

4. The method as set forth in claim 1, further comprising judging said interim mail address invalid when said user instructs invalidation of said interim mail address, even if said interim mail address is judged valid in said step (c).

5. The method as set forth in claim 1, wherein said maximum number is varied by said user.

6. A method of issuing a mail address to a user who makes e-mail communication with a mail-receiver through a server, comprising:
(a) on receipt of a request from said user to issue an interim mail address, issuing an interim mail address to said user from said server;
(b) recording a mail address of said user, a mail address of said mail-receiver, said interim mail address, and an expiration date by which said user can transmit an e-mail having said interim mail address, into a mail-address recording table in a set;
(c) when an e-mail addressed to said interim mail address is received at said server, if it is within said expiration date, judging said interim mail address of the received e-mail valid; and
(d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user,
wherein said request is made when said server receives an e-mail from said user which e-mail is addressed to a mail-receiver not recorded in a user's telephone directory stored in said server, and further comprising converting a mail address of a transmitter in said e-mail received from said user, into said interim mail address.

7. The method as set forth in claim 6, further comprising the step of, (e) when a mail address of a transmitter of the received e-mail is not identical with a mail address of said mail-receiver recorded in said mail-address recording table, or when said interim mail address is judged invalid, rejecting transmission of the received e-mail to said user.

8. The method as set forth in claim 6, wherein said request is made when said server receives an e-mail from said user, and further comprising converting a mail address of a transmitter in said e-mail received from said user, into said interim mail address.

9. The method as set forth in claim 6, further comprising judging said interim mail address invalid when said user instructs invalidation of said interim mail address, even if said interim mail address is judged valid in said step (c).

10. The method as set forth in claim 6, wherein said expiration date is varied by said user.

11. A method of issuing a mail address to a user who makes e-mail communication with a mail-receiver through a server, comprising:
   (a) issuing an interim mail address in a terminal of said user;
   (b) transmitting a mail address of said user, a mail address of said mail-receiver, said interim mail address, and a maximum number by which said user is allowed to receive e-mails addressed to said interim mail address, to a mail-address recording table stored in said server;
   (c) when an e-mail addressed to said interim mail address is received at said server, if the number of receiving e-mails addressed to said interim mail address is smaller than said maximum number, judging said interim mail address of the received e-mail valid; and
   (d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user,
   wherein said request is made when an e-mail addressed to a mail-receiver not recorded in a user's telephone directory stored in said terminal is made in said terminal, and further comprising converting a mail address of a transmitter in said e-mail received from said user, into said interim mail address.

12. The method as set forth in claim 11, further comprising the step of, (e) when a mail address of a transmitter of the received e-mail is not identical with a mail address of said mail-receiver recorded in said mail-address recording table, or when said interim mail address is judged invalid, rejecting transmission of the received e-mail to said user.

13. The method as set forth in claim 11, wherein said request is made when said user selects issuance of said interim mail address for transmitting an e-mail made in said terminal, and further comprising converting a mail address of a transmitter in said e-mail received from said user, into said interim mail address.

14. The method as set forth in claim 11, further comprising judging said interim mail address invalid when said user instructs invalidation of said interim mail address, even if said interim mail address is judged valid in said step (c).

15. The method as set forth in claim 11, wherein said maximum number is varied by said user.

16. A method of issuing a mail address to a user who makes e-mail communication with a mail-receiver through a server, comprising:
   (a) issuing an interim mail address in a terminal of said user;
   (b) transmitting a mail address of said user, a mail address of said mail-receiver, said interim mail address, and an expiration date by which said user can transmit an e-mail having said interim mail address, to a mail-address recording table stored in said server;
   (c) when an e-mail addressed to said interim mail address is received at said server, if it is within said expiration date, judging said interim mail address of the received e-mail valid; and
   (d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user,
   wherein said request is made when an e-mail addressed to a mail-receiver not recorded in a user's telephone directory stored in said terminal is made in said terminal, and further comprising converting a mail address of a transmitter in said e-mail received from said user, into said interim mail address.

17. The method as set forth in claim 16, further comprising the step of, (e) when a mail address of a transmitter of the received e-mail is not identical with a mail address of said mail-receiver recorded in said mail-address recording table, or when said interim mail address is judged invalid, rejecting transmission of the received e-mail to said user.

18. The method as set forth in claim 16, wherein said request is made when said user selects issuance of said interim mail address for transmitting an e-mail made in said terminal, and further comprising converting a mail address of a transmitter in said e-mail received from said user, into said interim mail address.

19. The method as set forth in claim 16, further comprising judging said interim mail address invalid when said user instructs invalidation of said interim mail address, even if said interim mail address is judged valid in said step (c).

20. The method as set forth in claim 16, wherein said expiration date is varied by said user.

21. A system for issuing a mail address to a user, comprising a terminal through which said user makes e-mail communication with a mail-receiver, and a server through which said user transmits an e-mail to said mail-receiver,
   said server including:
   (a) a first device which, on receipt of a request from said user to issue an interim mail address, issues an interim mail address to said user;
   (b) a second device which records a mail address of said user, a mail address of said mail-receiver, said interim mail address, and a maximum number by which said user is allowed to receive e-mails addressed to said interim mail address, into a mail-address recording table in a set;
   (c) a third device which, when an e-mail addressed to said interim mail address is received at said server, if the number of receiving e-mails addressed to said interim mail address is smaller than said maximum number, judges said interim mail address of the received e-mail valid; and
   (d) a sixth device which, when a mail address of a transmitter of the received e-mail is identical with a mail address of said mail-receiver recorded in said mail-address recording table and further when said interim mail address is judged valid, reads a mail address of said user out of said mail-address recording table, and converts said interim mail address to said mail address of said user,
   wherein said request is made when said first device receives an e-mail from said user which e-mail is addressed to a mail-receiver not recorded in a user's telephone directory stored in said server, and said server further includes a fifth device which converts a mail address of a transmitter in said e-mail received from said user, into said interim mail address.

22. The system as set forth in claim 21, wherein said server further includes (e) a seventh system which, when a mail address of a transmitter of the received e-mail is not identical with a mail address of said mail-receiver recorded in said mail-address recording table, or when said interim mail address is judged invalid, rejects transmission of the received e-mail to said user.

23. The system as set forth in claim 21, wherein said request is made when said first device receives an e-mail from said user, and said server further includes a fifth device which converts a mail address of a transmitter in said e-mail received from said user, into said interim mail address.

24. The system as set forth in claim 21, wherein said third device judges said interim mail address invalid when said user instructs invalidation of said interim mail address, even if said interim mail address is judged valid, based on said mail-address recording table.

25. The system as set forth in claim 21, wherein said maximum number is varied by said user.

26. A system for issuing a mail address to a user, comprising a terminal through which said user makes e-mail communication with a mail-receiver, and a server through which said user transmits an e-mail to said mail-receiver,
said server including:
(a) a first device which, on receipt of a request from said user to issue an interim mail address, issues an interim mail address to said user;
(b) a second device which records a mail address of said user, a mail address of said mail-receiver, said interim mail address, and an expiration date by which said user can transmit an e-mail having said interim mail address, into a mail-address recording table in a set;
(c) a third device which, when an e-mail addressed to said interim mail address is received at said server, if it is within said expiration date, judges said interim mail address of the received e-mail valid; and
(d) a sixth device which, when a mail address of a transmitter of the received e-mail is identical with a mail address of said mail-receiver recorded in said mail-address recording table and further when said interim mail address is judged valid, reads a mail address of said user out of said mail-address recording table, and converts said interim mail address to said mail address of said user,
wherein said request is made when said first device receives an e-mail from said user which e-mail is addressed to a mail-receiver not recorded in a user's telephone directory stored in said server, and said server further includes a fifth device which converts a mail address of a transmitter in said e-mail received from said user, into said interim mail address.

27. The system as set forth in claim 26, wherein said server further includes (e) a seventh device which, when a mail address of a transmitter of the received e-mail is not identical with a mail address of said mail-receiver recorded in said mail-address recording table, or when said interim mail address is judged invalid, rejects transmission of the received e-mail to said user.

28. The system as set forth in claim 26, wherein said request is made when said first device receives an e-mail from said user, and said server further includes a fifth device which converts a mail address of a transmitter in said e-mail received from said user, into said interim mail address.

29. The system as set forth in claim 26, wherein said third device judges said interim mail address invalid when said user instructs invalidation of said interim mail address, even if said interim mail address is judged valid, based on said mail-address recording table.

30. The system as set forth in claim 26, wherein said expiration date is varied by said user.

31. A system for issuing a mail address to a user, comprising a terminal through which said user makes e-mail communication with a mail-receiver, and a server through which said user transmits an e-mail to said mail-receiver,
said terminal including:
(a) a first device which issues an interim mail address in a terminal of said user; and
(b) a second device which transmits a mail address of said user, a mail address of said mail-receiver, said interim mail address, and a maximum number by which said user is allowed to receive e-mails addressed to said interim mail address, to a mail-address recording table stored in said server,
said server including:
(c) a third device which, when an e-mail addressed to said interim mail address is received at said server, if the number of receiving e-mails addressed to said interim mail address is smaller than said maximum number, judges said interim mail address of the received e-mail valid; and
(d) a sixth device which, when a mail address of a transmitter of the received e-mail is identical with a mail address of said mail-receiver recorded in said mail-address recording table and further when said interim mail address is judged valid, reads a mail address of said user out of said mail-address recording table, and converts said interim mail address to said mail address of said user,
wherein said first device judges that a request is made when an e-mail addressed to a mail-receiver not recorded in a user's telephone directory stored in said terminal is made in said terminal, and said terminal further includes a fifth device which converts a mail address of a transmitter in said e-mail received from said user, into said interim mail address.

32. The system as set forth in claim 31, further comprising (e) a seventh device which, when a mail address of a transmitter of the received e-mail is not identical with a mail address of said mail-receiver recorded in said mail-address recording table, or when said interim mail address is judged invalid, rejects transmission of the received e-mail to said user.

33. The system as set forth in claim 31, wherein said first device judges that said request is made when said user selects issuance of said interim mail address for transmitting an e-mail made in said terminal, and said terminal further includes a fifth device which converts a mail address of a transmitter in said e-mail received from said user, into said interim mail address.

34. The system as set forth in claim 31, wherein said third device judges said interim mail address invalid when said user instructs invalidation of said interim mail address, even if said interim mail address is judged valid, based on said mail-address recording table.

35. The system as set forth in claim 31, wherein said maximum number is varied by said user.

36. A system for issuing a mail address to a user, comprising a terminal through which said user makes e-mail communication with a mail-receiver, and a server through which said user transmits an e-mail to said mail-receiver,
said terminal including:
(a) a first device which issues an interim mail address in a terminal of said user; and
(b) a second device which transmits a mail address of said user, a mail address of said mail-receiver, said interim mail address, and an expiration date by which said user can transmit an e-mail having said interim mail address, to a mail-address recording table stored in said server, said server including:
(c) a third device which, when an e-mail addressed to said interim mail address is received at said server, if it is within said expiration date, judges said interim mail address of the received e-mail valid; and
(d) a sixth device which, when a mail address of a transmitter of the received e-mail is identical with a mail address of said mail-receiver recorded in said mail-address recording table and further when said interim mail address is judged valid, reads a mail address of said user out of said mail-address recording table, and converts said interim mail address to said mail address of said user,
wherein said first device judges that a request is made when an e-mail addressed to a mail-receiver not recorded in a user's telephone directory stored in said terminal is made in said terminal, and said terminal further includes a fifth device which converts a mail address of a transmitter in said e-mail received from said user, into said interim mail address.

37. The system as set forth in claim 36, further comprising (e) a seventh device which, when a mail address of a transmitter of the received e-mail is not identical with a mail address of said mail-receiver recorded in said mail-address recording table, or when said interim mail address is judged invalid, rejects transmission of the received e-mail to said user.

38. The system as set forth in claim 36, wherein said first device judges that said request is made when said user selects issuance of said interim mail address for transmitting an e-mail made in said terminal, and said terminal further includes a fifth device which converts a mail address of a transmitter in said e-mail received from said user, into said interim mail address.

39. The system as set forth in claim 36, wherein said third device judges said interim mail address invalid when said user instructs invalidation of said interim mail address, even if said interim mail address is judged valid, based on said mail-address recording table.

40. The system as set forth in claim 36, wherein said expiration date is varied by said user.

41. A server through which e-mails are transmitted, comprising:
(a) a first device which, on receipt of a request from said user to issue an interim mail address, issues an interim mail address to said user;
(b) a second device which records a mail address of said user, a mail address of said mail-receiver, said interim mail address, and a maximum number by which said user is allowed to receive e-mails addressed to said interim mail address, into a mail-address recording table in a set;
(c) a third device which, when an e-mail addressed to said interim mail address is received at said server, if the number of receiving e-mails addressed to said interim mail address is smaller than said maximum number, judges said interim mail address of the received e-mail valid;
(d) a ninth device which, when said interim mail address is judged valid, reads a mail address of said user out of said mail-address recording table; and
(e) a tenth device which converts said interim mail address to said mail address of said user,
wherein said first device judges that aid request is made when said first device receives an e-mail from said user which e-mail is addressed to a mail-receiver not recorded in a user's telephone directory stored in said server, and further including a fifth device which converts a mail address of a transmitter in said e-mail received from said user, into said interim mail address.

42. The server as set forth in claim 41, wherein said first device judges that said request is made when said first device receives an e-mail from said user, and further including a fifth device which converts a mail address of a transmitter in said e-mail received from said user, into said interim mail address.

43. The server as set forth in claim 41, wherein said third device judges said interim mail address invalid when said user instructs invalidation of said interim mail address, even if said interim mail address is judged valid, based on said mail-address recording table.

44. The server as set forth in claim 41, wherein said maximum number is varied by said user.

45. A server through which e-mails are transmitted, comprising:
(a) a first device which, on receipt of a request from said user to issue an interim mail address, issues an interim mail address to said user;
(b) a second device which records a mail address of said user, a mail address of said mail-receiver, said interim mail address, and a maximum number by which said user is allowed to receive e-mails addressed to said interim mail address, into a mail-address recording table in a set;
(c) a third device which, when an e-mail addressed to said interim mail address is received at said server, if the number of receiving e-mails addressed to said interim mail address is smaller than said maximum number, judges said interim mail address of the received e-mail valid;
(d) a ninth device which, when said interim mail address is judged valid, reads a mail address of said user out of said mail-address recording table; and
(e) a tenth device which converts said interim mail address to said mail address of said user,
wherein said first device judges that said request is made when said first device receives an e-mail from said user which e-mail is addressed to a mail-receiver not recorded in a user's telephone directory stored in said server, and further including a fifth device which converts a mail address of a transmitter in said e-mail received from said user, into said interim mail address.

46. The server as set forth in claim 45, wherein said first device judges that said request is made when said first device receives an e-mail from said user, and further including a fifth device which converts a mail address of a transmitter in said e-mail received from said user, into said interim mail address.

47. The server as set forth in claim 45, wherein said third device judges said interim mail address invalid when said user instructs invalidation of said interim mail address, even if said interim mail address is judged valid, based on said mail-address recording table.

48. The server as set forth in claim 45, wherein said expiration date is varied by said user.

49. A server through which e-mails are transmitted, comprising:
(a) a first device which, on receipt of a request from a user to issue an interim mail address, issues an interim mail address to said user;
(b) a second device which receives a mail address of said user, said interim mail address issued in a terminal of said user, a mail address of a mail-receiver, and a maximum number by which said user is allowed to receive e-mails addressed to said interim mail address, from said terminal, and stores them in a mail-address recording table;

(c) a third device which, when an e-mail addressed to said interim mail address is received at said server, if the number of receiving e-mails addressed to said interim mail address is smaller than said maximum number, judges said interim mail address of the received e-mail valid; and (d) a sixth device which, when a mail address of a transmitter of the received e-mail is identical with a mail address of said mail-receiver recorded in said mail-address recording table and further when said interim mail address is judged valid, reads a mail address of said user out of said mail-address recording table, and converts said interim mail address to said mail address of said user, wherein said first device judges that said request is made when said first device receives an e-mail from said user which e-mail is addressed to a mail-receiver not recorded in a user's telephone directory stored in said server, and further including a fifth device which converts a mail address of a transmitter in said e-mail received from said user, into said interim mail address.

50. The server as set forth in claim 49, further comprising a seventh device which, when a mail address of a transmitter of the received e-mail is not identical with a mail address of said mail-receiver recorded in said mail-address recording table, or when said interim mail address is judged invalid, rejects transmission of the received e-mail to said user.

51. The server as set forth in claim 49, wherein said third device judges said interim mail address invalid when said user instructs invalidation of said interim mail address, even if said interim mail address is judged valid, based on said mail-address recording table.

52. The server as set forth in claim 49, wherein said maximum number is varied by said user.

53. A server through which e-mails are transmitted, comprising:

(a) a first device which, on receipt of a request from a user to issue an interim mail address, issues an interim mail address to said user;

(b) a second device which receives a mail address of said user, said interim mail address issued in a terminal of said user, a mail address of a mail-receiver, and an expiration date by which said user can transmit an e-mail having said interim mail address, from said terminal, and stores them in a mail-address recording table;

(c) a third device which, when an e-mail addressed to said interim mail address is received at said server, if it is within said expiration date, judges said interim mail address of the received e-mail valid; and (d) a sixth device which, when a mail address of a transmitter of the received e-mail is identical with a mail address of said mail-receiver recorded in said mail-address recording table and further when said interim mail address is judged valid, reads a mail address of said user out of said mail-address recording table, and converts said interim mail address to said mail address of said user, wherein said first device judges that said request is made when said first device receives an e-mail from said user which e-mail is addressed to a mail-receiver not recorded in a user's telephone directory stored in said server, and further including a fifth device which converts a mail address of a transmitter in said e-mail received from said user, into said interim mail address.

54. The server as set forth in claim 53, further comprising a seventh device which, when a mail address of a transmitter of the received e-mail is not identical with a mail address of said mail-receiver recorded in said mail-address recording table, or when said interim mail address is judged invalid, rejects transmission of the received e-mail to said user.

55. The server as set forth in claim 53, wherein said third device judges said interim mail address invalid when said user instructs invalidation of said interim mail address, even if said interim mail address is judged valid, based on said mail-address recording table.

56. The server as set forth in claim 53, wherein said expiration date is varied by said user.

57. A computer-readable storage medium storing therein a program for causing a computer to carry out a method of issuing a mail address to a user who makes e-mail communication with a mail-receiver through a server, wherein steps executed by said computer in accordance with said program include:

(a) on receipt of a request from said user to issue an interim mail address, issuing an interim mail address to said user from said server;

(b) recording a mail address of said user, a mail address of said mail-receiver, said interim mail address, and a maximum number by which said user is allowed to receive e-mails addressed to said interim mail address, into a mail-address recording table in a set;

(c) when an e-mail addressed to said interim mail address is received at said server, if the number of receiving e-mails addressed to said interim mail address is smaller than said maximum number, judging said interim mail address of the received e-mail valid; and (d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user, wherein said request is made when said server receives an e-mail from said user which e-mail is addressed to a mail-receiver not recorded in a user's telephone directory stored in said server, and further comprising converting a mail address of a transmitter in said e-mail received from said user, into said interim mail address.

58. The program as set forth in claim 57, wherein said steps further include, when a mail address of a transmitter of the received e-mail is not identical with a mail address of said mail-receiver recorded in said mail-address recording table, or when said interim mail address is judged invalid, rejecting transmission of the received e-mail to said user.

59. The program as set forth in claim 57, wherein said steps further include judging said interim mail address invalid when said user instructs invalidation of said interim mail address, even if said interim mail address is judged valid in said step (c).

60. A computer-readable storage medium storing therein a program for causing a computer to carry out a method of issuing a mail address to a user who makes e-mail communication with a mail-receiver through a server, wherein steps executed by said computer in accordance with said program include:

(a) on receipt of a request from said user to issue an interim mail address, issuing an interim mail address to said user from said server;

(b) recording a mail address of said user, a mail address of said mail-receiver, said interim mail address, and an expiration date by which said user can transmit an e-mail having said interim mail address, into a mail-address recording table in a set;

(c) when an e-mail addressed to said interim mail address is received at said server, if it is within said expiration date, judging said interim mail address of the received e-mail valid; and (d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user, wherein said request is made when said server receives an e-mail from said user which e-mail is addressed to a mail-receiver not recorded in a user's telephone directory stored in said server, and further comprising converting a mail address of a transmitter in said e-mail received from said user, into said interim mail address.

61. The program as set forth in claim 60, wherein said steps further include, when a mail address of a transmitter of the received e-mail is not identical with a mail address of said mail-receiver recorded in said mail-address recording table, or when said interim mail address is judged invalid, rejecting transmission of the received e-mail to said user.

62. The program as set forth in claim 60, wherein said steps further include judging said interim mail address invalid when said user instructs invalidation of said interim mail address, even if said interim mail address is judged valid in said step (c).

63. A computer-readable storage medium storing therein a program for causing a computer to carry out a method of issuing a mail address to a user who makes e-mail communication with a mail-receiver through a server, wherein steps executed by said computer in accordance with said program include:

(a) issuing an interim mail address in a terminal of said user;

(b) transmitting a mail address of said user, a mail address of said mail-receiver, said interim mail address, and a maximum number by which said user is allowed to receive e-mails addressed to said interim mail address, to a mail-address recording table stored in said server;

(c) when an e-mail addressed to said interim mail address is received at said server, if the number of receiving e-mails addressed to said interim mail address is smaller than said maximum number, judging said interim mail address of the received e-mail valid;

(d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user, wherein said request is made when said server receives an e-mail from said user which e-mail is addressed to a mail-receiver not recorded in a user's telephone directory stored in said server, and further comprising converting a mail address of a transmitter in said e-mail received from said user, into said interim mail address.

64. The program as set forth in claim 63, wherein said steps further include, when a mail address of a transmitter of the received e-mail is not identical with a mail address of said mail-receiver recorded in said mail-address recording table, or when said interim mail address is judged invalid, rejecting transmission of the received e-mail to said user.

65. The program as set forth in claim 63, wherein said steps further include judging said interim mail address invalid when said user instructs invalidation of said interim mail address, even if said interim mail address is judged valid in said step (c).

66. A computer-readable storage medium storing therein a program for causing a computer to carry out a method of issuing a mail address to a user who makes e-mail communication with a mail-receiver through a server, wherein steps executed by said computer in accordance with said program include:

(a) issuing an interim mail address in a terminal of said user;

(b) transmitting a mail address of said user, a mail address of said mail-receiver, said interim mail address, and an expiration date by which said user can transmit an e-mail having said interim mail address, to a mail-address recording table stored in said server;

(c) when an e-mail addressed to said interim mail address is received at said server, if it is within said expiration date, judging said interim mail address of the received e-mail valid; and (d) when a mail address of a transmitter of the received e-mail is identical with a mail address of said mail-receiver recorded in said mail-address recording table and further when said interim mail address is judged valid, reading a mail address of said user out of said mail-address recording table, and converting said interim mail address to said mail address of said user, wherein said request is made when said server receives an e-mail from said user which e-mail is addressed to a mail-receiver not recorded in a user's telephone directory stored in said server, and further comprising converting a mail address of a transmitter in said e-mail received from said user, into said interim mail address.

67. The program as set forth in claim 66, wherein said steps further include, when a mail address of a transmitter of the received e-mail is not identical with a mail address of said mail-receiver recorded in said mail-address recording table, or when said interim mail address is judged invalid, rejecting transmission of the received e-mail to said user.

68. The program as set forth in claim 66, wherein said steps further include judging said interim mail address invalid when said user instructs invalidation of said interim mail address, even if said interim mail address is judged valid in said step (c).

* * * * *